United States Patent
Scoullar et al.

(10) Patent No.: US 9,310,513 B2
(45) Date of Patent: Apr. 12, 2016

(54) METHOD AND APPARATUS FOR BOREHOLE LOGGING

(75) Inventors: Paul Andrew Basil Scoullar, Fitzroy North (AU); Robin John Evans, Aspendale (AU); Christopher Charles McLean, Kangaroo Flat (AU)

(73) Assignee: Southern Innovation International Pty Ltd., Victoria (AU)

(*) Notice: Subject to any disclaimer, the term of this patent is extended or adjusted under 35 U.S.C. 154(b) by 1233 days.

(21) Appl. No.: 12/935,589

(22) PCT Filed: Mar. 31, 2009

(86) PCT No.: PCT/AU2009/000394
§ 371 (c)(1),
(2), (4) Date: Dec. 23, 2010

(87) PCT Pub. No.: WO2009/121131
PCT Pub. Date: Oct. 8, 2009

(65) Prior Publication Data
US 2011/0112810 A1    May 12, 2011

Related U.S. Application Data

(60) Provisional application No. 61/041,141, filed on Mar. 31, 2008, provisional application No. 61/138,879, filed on Dec. 18, 2008.

(51) Int. Cl.
*G01V 5/10* (2006.01)
*G01T 1/17* (2006.01)
*G01V 5/12* (2006.01)

(52) U.S. Cl.
CPC ............... *G01V 5/101* (2013.01); *G01T 1/171* (2013.01); *G01V 5/125* (2013.01)

(58) Field of Classification Search
CPC ................ G01V 5/101; G01T 1/171
USPC ............................................... 703/2
See application file for complete search history.

(56) References Cited

U.S. PATENT DOCUMENTS 3,379,882 A * 4/1968 Youmans ............... 250/264
4,658,216 A   4/1987 Goulding et al.
(Continued)

FOREIGN PATENT DOCUMENTS

CN   101666227     3/2010
EP   0 790 508 A2  8/1997
(Continued)

OTHER PUBLICATIONS

Steven W. Smith, "The Scientist and Engineer's Guide to Digital Signal Processing," 1997, California Technical Publishing, pp. 300-307.*

(Continued)

*Primary Examiner* — Kamini S Shah
*Assistant Examiner* — Russ Guill
(74) *Attorney, Agent, or Firm* — Knobbe, Martens, Olson & Bear, LLP

(57) ABSTRACT

A method and apparatus for borehole logging, the method comprising collecting detector output data from a radiation detector of a borehole logging tool, and resolving individual signals in the detector output data by (i) determining a signal form of signals present in the data, (ii) making parameter estimates of one or more parameters of the signals, wherein the one or more parameters comprise at least a signal temporal position, and (iii) determining the energy of each of the signals from at least the signal form and the parameter estimates. The logging tool is shorter, logging tool speed is greater, dwell time is shorter and/or resolution is improved.

36 Claims, 21 Drawing Sheets

(56) References Cited

U.S. PATENT DOCUMENTS

| | | | |
|---|---|---|---|
| 4,760,252 A * | 7/1988 | Albats et al. | 250/390.07 |
| 5,210,423 A | 5/1993 | Arseneau | |
| 5,225,682 A | 7/1993 | Britton et al. | |
| 5,349,193 A | 9/1994 | Mott et al. | |
| 5,349,195 A | 9/1994 | Dumont | |
| 5,424,636 A * | 6/1995 | Rollwage | G01P 3/48 324/160 |
| 5,506,769 A * | 4/1996 | Fu et al. | 702/8 |
| 5,532,944 A | 7/1996 | Battista | |
| 5,884,234 A | 3/1999 | Jorion et al. | |
| 6,057,551 A | 5/2000 | Tararine | |
| 6,150,655 A * | 11/2000 | Odom et al. | 250/269.6 |
| 6,160,259 A | 12/2000 | Petrillo et al. | |
| 6,215,122 B1 | 4/2001 | Clifford et al. | |
| 6,253,155 B1 * | 6/2001 | Hagiwara | 702/9 |
| 6,590,957 B1 | 7/2003 | Warburton et al. | |
| 6,594,585 B1 * | 7/2003 | Gersztenkorn | 702/14 |
| 6,751,564 B2 * | 6/2004 | Dunthorn | G01R 23/16 702/66 |
| 7,139,350 B2 | 11/2006 | Tiller et al. | |
| 7,439,515 B2 | 10/2008 | Bak | |
| 7,558,675 B2 * | 7/2009 | Sugiura | 702/9 |
| 7,725,281 B2 | 5/2010 | Jordanov | |
| 7,763,859 B2 | 7/2010 | Mott | |
| 7,817,762 B2 | 10/2010 | Johnstone et al. | |
| 7,999,220 B2 | 8/2011 | Odom | |
| 8,227,761 B2 | 7/2012 | Zhu et al. | |
| 8,471,210 B2 * | 6/2013 | Scoullar | A61B 6/037 250/362 |
| 8,812,268 B2 * | 8/2014 | Scoullar | G01V 1/28 702/182 |
| 2003/0069710 A1 * | 4/2003 | Geddes | 702/108 |
| 2003/0076914 A1 | 4/2003 | Tiller et al. | |
| 2003/0178573 A1 * | 9/2003 | Craig et al. | 250/390.04 |
| 2005/0028586 A1 * | 2/2005 | Smits et al. | 73/152.14 |
| 2006/0157355 A1 * | 7/2006 | Mammone et al. | 250/395 |
| 2007/0147702 A1 * | 6/2007 | Scoullar et al. | 382/276 |
| 2008/0049214 A1 * | 2/2008 | Maznev et al. | 356/51 |
| 2010/0074397 A1 | 3/2010 | Kappler et al. | |
| 2010/0270473 A1 | 10/2010 | Kraft et al. | |
| 2011/0035197 A1 * | 2/2011 | Scoullar et al. | 703/2 |

FOREIGN PATENT DOCUMENTS

| | | |
|---|---|---|
| GB | 2 263 767 A | 8/1993 |
| JP | 10186041 | 7/1998 |
| JP | 2001337168 | 12/2001 |
| JP | 3836629 B2 | 10/2006 |
| JP | 3907910 B2 | 4/2007 |
| JP | 3980451 B2 | 9/2007 |
| JP | 2009229127 | 10/2009 |
| JP | 4358814 B2 | 11/2009 |
| JP | 4706566 B2 | 6/2011 |
| JP | 4787989 B2 | 10/2011 |
| KR | 20110120015 | 11/2011 |
| WO | WO 94/28438 | 12/1994 |
| WO | WO 97/07591 | 2/1997 |
| WO | WO 99/58999 | 11/1999 |
| WO | WO 00/39600 | 7/2000 |
| WO | WO 02/097471 | 12/2002 |
| WO | WO 03/040757 | 5/2003 |
| WO | WO 2005/121835 | 12/2005 |
| WO | WO 2005/121988 | 12/2005 |
| WO | WO 2006/029475 A1 | 3/2006 |
| WO | WO 2007/049168 | 5/2007 |
| WO | WO 2007/146350 | 12/2007 |
| WO | WO 2008/089014 | 7/2008 |
| WO | WO 2008/155679 | 12/2008 |
| WO | WO 2009/020863 | 2/2009 |
| WO | WO 2009/020866 | 2/2009 |
| WO | WO 2009/032452 | 3/2009 |
| WO | WO 2009/043095 A1 | 4/2009 |
| WO | WO 2009/050619 | 4/2009 |
| WO | WO 2009/059312 | 5/2009 |
| WO | WO 2009/076256 | 6/2009 |
| WO | WO 2010/014576 | 2/2010 |
| WO | WO 2011/002452 | 1/2011 |
| WO | WO 2011/023431 | 3/2011 |
| WO | WO 2011/039312 | 4/2011 |
| WO | WO 2012/029496 | 3/2012 |
| WO | WO 2012/088781 | 7/2012 |

OTHER PUBLICATIONS

Stephen D. Billings et al., "Deconvolution and spatial resolution of airborne gamma-ray surveys," 2003, Geophysics, vol. 68, No. 4, pp. 1257-1266.*

Craig Heimbach, "NIST Calibration of a neutron spectrometer," 2006, Journal of Research of the National Insttitute of Standards and Technology, vol. 111, No. 6, pp. 419-428.*

William H. Press et al., "Numerical Recipes in Fortran 77 The Art of Scientific Computing," Second edition, 1997, Cambridge University Press, pp. 530-535.*

"Application Note 150-2 Spectrum Analysis . . . Pulsed RF," 1971, Hewlett-Packard, pp. 1-33.*

Golub et al., Matrix Computations, The Johns Hopkins University Press, (1989), $2^{nd}$ Ed.—TOC only.

Haykin, S., Adaptive Filter Theory, Pearson Prentice Hall (2002), $4^{th}$ Ed.—TOC only.

Meng et al., An Inter-comparison of Three Spectral-Deconvolution Algorithms for Gamma-ray Spectroscopy, IEEE Transact Nucl Science (Aug. 2000) 47(4): 1329-1336.

International Search Report mailed May 27, 2009, for International Application No. PCT/AU2009/000394, filed Mar. 31, 2009.

International Preliminary Report on Patentability dated Oct. 5, 2010 for International Application No. PCT/AU2009/000394, filed Mar. 31, 2009.

* cited by examiner

METHOD AND APPARATUS FOR BOREHOLE LOGGING

RELATED APPLICATION

This application is based on and claims the benefit of the filing date of U.S. application No. 61/041,141 filed 31 Mar. 2008 and of U.S. application No. 61/138,879 filed 18 Dec. 2008, the contents of which as filed are incorporated herein by reference in their entirety.

FIELD OF THE INVENTION

The present invention relates generally to a method and apparatus for borehole logging, of particular but by no means exclusive application to oil well logging.

BACKGROUND OF THE INVENTION

In mineral and oil exploration, borehole logging is used to determine the subsurface content of rocks and mineral deposits.

Nuclear logging tools provide valuable data to the oil industry and have been used in oil well logging for more than 30 years. Data on the porosity and density of rock formations, which is used to help detect the presence of geological reservoirs and their contents (e.g. oil, gas or water), form one of the log suites used in oil well logging.

The existing digital pulse processing techniques employed in borehole logging rely on linear filtering methodologies. However, with increasing count rate, the high-pass filters required to shorten pulse length and increase throughput also degrade signal-to-noise ratio (SNR), and ultimately, energy resolution. This limits the count rate that can be employed, the strength of the source, the proximity of the source and detector, or combinations of these parameters. In bore-hole logging applications, for example, overall measurement time is very important. The information lost due to the discarding of pile-up events extends the collection time required to obtain sufficient accuracy in the estimation of elemental concentration and ultimately places an upper limit on the speed at which a well can be logged. U.S. Pat. No. 4,883,956, for example, assesses the benefits of a new radiation detection crystal, cerium-doped gadolinium orthosilicate (GSO). The decay time of GSO detectors results in less pile-up for any particular count-rate, or accommodates a higher count-rate for a particular acceptable pile-up.

SUMMARY OF THE INVENTION

According to a first aspect of the invention, therefore, there is provided a method of borehole logging, comprising:
  collecting detector output data from a radiation detector of a borehole logging tool; and
  resolving individual signals in the detector output data by (i) determining a signal form (or an impulse response) of signals present in said data, (ii) making parameter estimates of one or more parameters of said signals, wherein said one or more parameters comprise at least a signal temporal position, and (iii) determining the energy of each of said signals from at least said signal form and said parameter estimates;
  whereby the logging tool is shorter, logging tool speed is greater, dwell time (i.e. irradiation and/or data collection time) is shorter and/or resolution is improved.

Thus, this method endeavors to characterize as much data as possible, but it will be appreciated that it may not be possible to adequately characterize some data (which hence is termed 'corrupt data'), as is described below. It will be understood that the term 'signal' is interchangeable in this context with 'pulse', as it refers to the output corresponding to individual detection events rather than the overall output signal comprising the sum of individual signals. It will also be appreciated that the temporal position (or timing) of a signal can be measured or expressed in various ways, such as according to the time (or position in the time axis) of the maximum of the signal or the leading edge of the signal. Typically this is described as the arrival time ('time of arrival') or detection time. It will also be understood that the term 'detector data' refers to data that has originated from a detector, whether processed subsequently by associated or other electronics within or outside the detector.

The method may include constructing a model of the data from the parameter estimates, and determining the accuracy of the parameter estimates based on a comparison between the detector output data and the model.

The signal form (or impulse response) may be determined by a calibration process that involves measuring the detector's time domain response to one or more single event detections to derive from that data the signal form or impulse response. A functional form of this signal form may then be obtained by interpolating the data with (or fitting to the data) a suitable function such as a polynomial, exponential or spline. A filter (such as an inverse filter) may then be constructed from this detector signal form. An initial estimate of signal parameters may be made by convolution of the output data from the detector with the filter. Signal parameters of particular interest include the number of signals and the temporal position (or time of arrival) of each of the signals.

The particular signal parameters of interest can then be further refined. Firstly, the estimate of the number and arrival times of signals is refined with the application of peak detection and a threshold. Secondly, knowledge of the number of signals and their arrival time, coupled with the detector impulse response (and hence signal form) makes it possible to solve for the energy parameters of the signals.

The accuracy of the parameter estimation can be determined or 'validated' by comparing a model (in effect, an estimate) of the detector data stream (constructed from the signal parameters and knowledge of the detector impulse response) and the actual detector output. Should this validation process determine that some parameters are insufficiently accurate, these parameters are discarded. In spectroscopic analysis using this method, the energy parameters deemed sufficiently accurate may be represented as a histogram.

The method may include making the estimates of signal parameters in accordance with the signal form (i.e. the impulse response of the detector used for generating the signal). The method may include determining the signal form by a calibration process including measuring the response of the detector to one or more single detections to derive a data based model of the signal form. In particular, the method may include obtaining a functional form of the model by interpolating the data with a function to generate the expected signal form. The function may be a polynomial, exponential or spline function.

The method may include designing a filter on the basis of the predetermined form of the individual signals produced by the radiation detector. The filter may be, for example, of matched filter or inverse filter form.

In one embodiment, the method includes using convolution of the detector output and filter to make an initial estimate of the signal parameters. The method may include refining the estimate of the signal parameters. The method may include refining the estimate of signal number with a peak detection process. The method may include making or refining the estimate of signal temporal position by application of a peak detection process. The method may include refining the estimate of signal energy by solving a system of linear equations, by matrix inversion or by iterative techniques.

In an embodiment of the invention, the method includes creating a model of the detector output using the signal parameters in combination with the detector impulse response. The method may include performing error detection by, for example, comparing the actual detector output data with the model of the detector output, such as by using least-squares or some other measure of the difference between the data and the model.

The method may include discarding parameters deemed not sufficiently accurately estimated.

In one embodiment, the method includes presenting all sufficiently accurate energy parameters in a histogram.

The data may include signals of different forms. In this case, the method may include determining where possible the signal form of each of the signals.

In one embodiment, the method includes progressively subtracting from the data those signals that acceptably conform to successive signal forms of a plurality of signal forms, and rejecting those signals that do not acceptably conform to any of the plurality of signal forms.

In one embodiment, the resolving of individual signals comprises: obtaining the detector output data as digitized detector output data in a form of a digital time series; and forming a mathematical model based on the digital time series and as a function of at least the signal form, the temporal position of the at least one signal, and an amplitude of the at least one signal; wherein determining the energy of each of the signals comprises determining the amplitude of the signals based on the mathematical model, the amplitude being indicative of a radiation event.

In one embodiment, the method comprises oil well logging.

The logging tool may be less than 3 m In length, and in some cases less than 2.7 m in length or even less than 2.4 m in length.

The resolving of the signals may reduce dwell time by a factor of 2 or more, and in some case by a factor of 5 or more. The resolving of the signals may increase logging tool speed by a factor of 2 or more or in some cases by a factor of 5 or more.

The method may be characterized by an incident flux on the radiation detector of gamma-rays of 500 kHz or more.

The method may be characterized by a data throughput of greater than 90% for an input count rate of 200 kHz.

The method may be characterized by a data throughput of greater than 70% for input count rate between 500 and 2000 kHz.

The method may be characterized by a data throughput of greater than 95% for an input count rate of 100 kHz.

The method may be characterized by a data throughput of greater than 95% for input count rates between 100 and 200 kHz.

The method may comprise an input count rate of greater than 750 kHz.

The method may comprise an input count rate of greater than 1 MHz.

The detector may comprise a GSO detector.

The method may include pulse shaping the output of the detector.

The method may include employing a source synchronization signal to avoid misallocation of data.

In a second aspect, the invention provides an borehole logging apparatus, comprising:
  a borehole logging tool for irradiating a material surrounding the logging tool, detecting radiation emitted by the material, and for outputting detector data in response thereto; and
  a processor for receiving the detector data in digitized form, and programmed to determine the signal form of each of the signals present in the data, to make parameter estimates of one or more parameters of the signals, and to determine the energy of each of the signals from at least the signal form and the parameter estimates, wherein the one or more parameters comprise at least a signal temporal position;
  whereby the logging tool is shorter, logging tool speed is greater, dwell time is shorter or resolution and/is improved.

The processor may be programmed to obtain the detector output data in a form of a digital time series and to form a mathematical model based on the digital time series and as a function of at least the signal form, the temporal position of the signals, and an amplitude of the signals;
wherein determining the energy of each of the signals comprises determining the amplitude of the signals based on the mathematical model, the amplitude being indicative of a radiation event.

The apparatus may be adapted for oil well logging.

The logging tool may be less than 3 m in length.

Use of the processor may allow a reduction in dwell time by a factor of 5 or more. Also, use of the processor may allow an increase in logging tool speed by a factor of 5 or more.

The apparatus may be characterized by an incident flux on the radiation detector of gamma-rays of 500 kHz or more.

The apparatus may be characterized by a data throughput of greater than 90% for an input count rate of 200 kHz.

The apparatus may be characterized by a data throughput of greater than 70% for input count rates between 500 and 2000 kHz.

The apparatus may be characterized by a data throughput of greater than 95% for an input count rate of 100 kHz.

The apparatus may be characterized by a data throughput of greater than 95% for input count rates between 100 arid 200 kHz.

The apparatus may comprise an input count rate of greater than 750 kHz.

The apparatus may comprise an Input count rate of greater than 1 MHz.

The detector may comprise a GSO detector.

The apparatus may include a pulse shaping module for pulse shaping the output of the logging tool.

The logging tool will typically house both a radiation source and a radiation detector in a single housing, but the logging tool may be in a distributed form with, for example, the radiation source and radiation detector in separate housings.

In a third aspect, the invention provides a method of quantifying a chemical element in a formation traversed by a borehole, comprising:
  collecting detector output data from a radiation detector of a borehole logging tool; and
  resolving individual signals in the detector output data by (i) determining a signal form of signals present in the data, (ii) making parameter estimates of one or more parameters of the signals, wherein the one or more parameters comprise at least a signal temporal position, and (iii) determining the energy of each of the signals from at least the signal form and the parameter estimates;

determining a quantity of the element from at least those of the signals arising from instances of the element in the formation;

whereby the logging tool is shorter, logging tool speed is greater, dwell time is shorter and/or resolution is improved.

The resolving of individual signals may comprise:

obtaining the detector output data as digitized detector output data in a form of a digital time series; and forming a mathematical model based on the digital time series and as a function of at least the signal form, the temporal position of the at least one signal, and an amplitude of the at least one signal;

wherein determining the energy of each of the signals comprises determining the amplitude of the signals based on the mathematical model, the amplitude being indicative of a radiation event.

In a fourth aspect, the invention provides a method of borehole logging, comprising:

collecting detector output data from a radiation detector of a borehole logging tool; and resolving individual signals in the detector output data by (i) obtaining or expressing the detector output data as a digital series, (ii) obtaining or determining a signal form of signals present in the data, (iii) forming a transformed signal form by transforming the signal form according to a mathematical transform, (iv) forming a transformed series by transforming the digital series according to the mathematical transform, the transformed series comprising transformed signals, (v) evaluating a function of at least the transformed series and the transformed signal form and thereby providing a function output, (vi) modelling the function output according to a model, (vii) determining at least one parameter of the function output based on the model, and (viii) determining a parameter of the signals from the at least one determined parameter of the function output;

whereby the logging tool is shorter, logging tool speed is greater, dwell time is shorter and/or resolution is improved.

In a fifth aspect, the invention provides a borehole logging apparatus, comprising:

a borehole logging tool for irradiating a material surrounding the logging tool, detecting radiation emitted by the material, and for outputting detector data in response thereto; and a processor for receiving the data as a digital series, and programmed to (i) obtain or determine a signal form of signals present in the data, (ii) form a transformed signal form by transforming the signal form according to a mathematical transform, (iii) form a transformed series by transforming the digital series according to the mathematical transform, the transformed series comprising transformed signals, (iv) evaluate a function of at least the transformed series and the transformed signal form and thereby provide a function output, (v) model the function output according to a model, (vi) determine at least one parameter of the function output based on the model, and (vii) determine a parameter of the signals from the at least one determined parameter of the function output;

whereby the logging tool is shorter, logging tool speed is greater, dwell time is shorter and/or resolution is improved.

In a sixth aspect, the invention provides method of mineral logging, comprising:

collecting detector output data from a radiation detector of a mineral logging tool; and resolving individual signals In the detector output data by (i) determining a signal form of signals present in the data, (ii) making parameter estimates of one or more parameters of the signals, wherein the one or more parameters comprise at least a signal temporal position, and (iii) determining the energy of each of the signals from at least the signal form and the parameter estimates;

whereby the logging tool is shorter, logging tool speed is greater, dwell time is shorter and/or resolution is improved.

Thus, the present invention may also be used to log the composition of a mineral or minerals, which may be placed adjacent to the logging tool, passed by the logging tool (such as on a conveyor belt), logged in situ by a mobile logging tool, or otherwise.

In a seventh aspect, the invention provides a mineral logging apparatus, comprising:

a mineral logging tool for irradiating a material, detecting radiation emitted by the material, and for outputting detector data in response thereto; and a processor for receiving the detector data in digitized form, and programmed to determine the signal form of each of the signals present in the data, to make parameter estimates of one or more parameters of the signals, and to determine the energy of each of the signals from at least the signal form and the parameter estimates, wherein the one or more parameters comprise at least a signal temporal position;

whereby the logging tool is shorter, logging tool speed is greater, dwell time is shorter and/or resolution is improved.

In some embodiments, transforming the digital series according to the mathematical transform comprises forming a model of the digital series and transforming the model of the digital series according to the mathematical transform.

In certain embodiments, the method includes determining a plurality of parameters of the transformed signals, such as frequency and amplitude.

In certain particular embodiments, the transform is a Fourier transform, such as a fast Fourier transform or a discrete Fourier transform, or a wavelet transform. Indeed, in certain embodiments the transform may be applied somewhat differently to the signal form and digital series respectively. For example, in one embodiment the mathematical transform is the Fourier transform, but the signal form is transformed with a discrete Fourier transform and the digital series is transformed with a fast Fourier transform.

In one embodiment, the transform is a Fourier transform and the function is representable as $$Y(k)=X(k)/H(k)$$

where $X(k)$ is the transformed series and $H(k)$ is the transformed signal form.

The apparatus may include an analog to digital converter adapted to receive the data, to convert the data into digitized form, and forward the data in digitized form to the processor. This would be of particular use where the detector outputs analog data.

The apparatus may include the radiation detector.

The processor may comprise a field programmable gate array (or an array thereof). Alternatively, the processor may comprise a digital signal processor (or an array thereof). In a further alternative, the processor comprises a field programmable gate array (or an array thereof) and a digital signal processor (or an array thereof). In still another embodiment, the processor comprises an ASIC (Application Specific Integrated Circuit). The apparatus may include an analog front end that includes the analog to digital converter.

The apparatus may include an electronic computing device in data communication with the processor, for controlling the processor and for displaying an output of the processor.

It should be noted that the various optional features of each aspect of the invention may be employed where suitable and desired with any of the other aspects of the invention.

BRIEF DESCRIPTION OF THE DRAWINGS

In order that the invention may be more clearly ascertained, preferred embodiments will now be described, by way of example only, with reference to the accompanying drawing, in which.

DETAILED DESCRIPTION OF THE EMBODIMENTS

Figure 1:
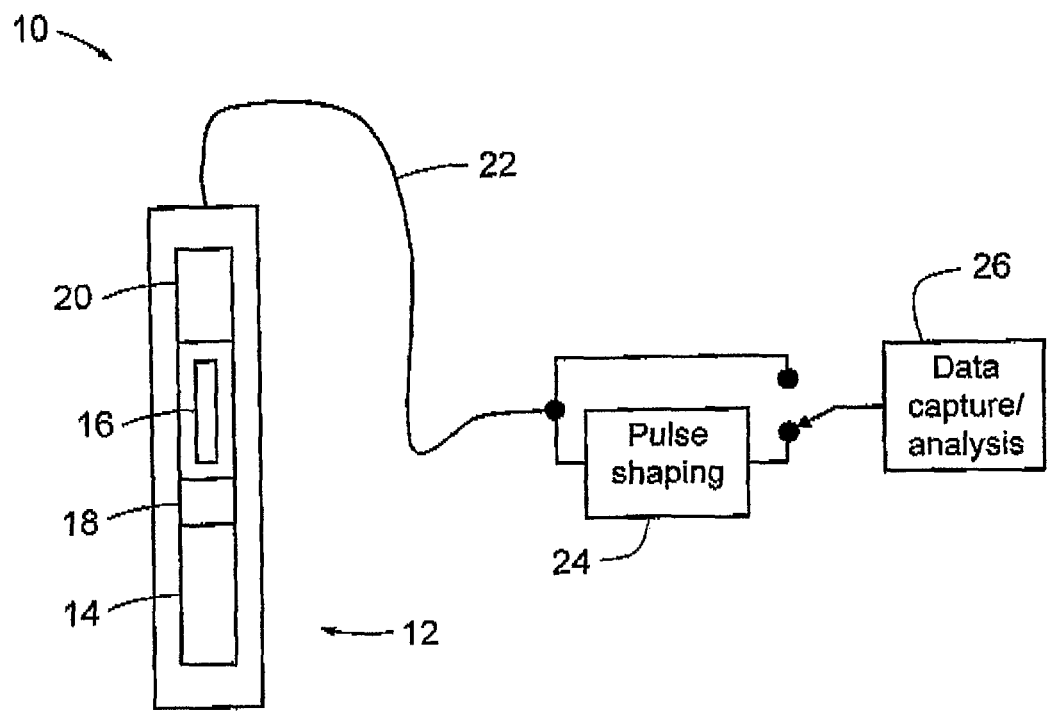
FIG. 1 is a view of an oil well logging apparatus according to an embodiment of the present invention.

FIG. 1 is a schematic view of an oil well logging apparatus 10 according to an embodiment of the present invention. Apparatus 10 includes a logging tool or 'collar' 12 for lowering into an oil well bore (or other borehole). Tool 12 has a neutron source 14 in the form of a pulsed neutron generator for generating neutrons for exciting the material surrounding the bore, a detector 16, a shield 18 separating the neutron source 14 and detector 16, and a pre-amplifier 20 coupled to the output of detector 16. An output of pre-amplifier 20 is coupled to a coaxial cable 22. It will be appreciated that tool 12 may include a plurality of detectors comparable to detector 16.

Apparatus 10 includes a pulse shaping module 24 and a data capture and analysis module 26. These are arranged so that the output of pre-amplifier 20 can be transmitted by coaxial cable 22 either to pulse shaping module 24 and hence to data capture module 26, or directly to data capture and analysis module 26. It should be appreciated that data capture and analysis module 26 may comprise either a computing device configured to both collect data and analyze that data as described below, or a plurality of components such as a data collection device and a distinct data analysis device for performing these functions. In the latter case, such data collection and data analysis devices may each comprise computing devices. In both cases, data capture and analysis module 26 includes a display.

Tool 12 is adapted to be used with a borehole of about 20 cm diameter, and of depths typical in this field (which may be as great as 10 km or more). The maximum depth into the surrounding material from which useful data may be collected is greater than with typical existing tools, owing to the ability of apparatus 10 to handle high count rates. This allows the use of stronger neutron sources that give rise to useful count rates from greater depths.

In addition, the ability of apparatus 10 to handle high count rates allows shield 18 to be thinner if desired, or the distance between source 14 and detector 16 to be reduced (or both). The overall length of tool 12 may thus be reduced. Also, the ability of apparatus 10 to extract more useful information from the output of tool 12 with effectively less pile-up (as is discussed below) allows irradiation or collection times—and hence "dwell" and total logging times—to be reduced.

Thus, at present the shortest tools are greater than 6.5 m in length. Test measurements with apparatus 10 (see below) suggest that an increase in tolerable count rate of at least a factor of 2 may be achieved, so it is envisaged that results comparable to the present state of the art may be obtained according to the present invention with a tool less than—and possibly considerably less than—6 m in length. Similarly, logging rates of about 135 m per hour (collecting two data points per 30 cm) have been reported: it is envisaged that comparable results may be obtained according to the present invention with a logging rates at least 50%—and possibly 100%—faster.

Pulse shaping module 24 performs pulse shaping of the output of pre-amplifier 20 to reduce the length of the pulses outputted by pre-amplifier 20, and is employed if necessary but may be omitted or bypassed. Whether or not pulse shaping module 24 is employed, the pre-amplifier signals are ultimately transmitted to data capture and analysis module 26.

Data capture and analysis module 26 includes a signal processing unit that comprises two parts: 1) an analog to digital converter which produces a digital output corresponding to the analog output of the detector unit, and 2) a processing unit which implements digital signal processing (DSP) routines in accordance with the present invention. The output signals of pre-amplifier 20 are coupled connected to the signal processing unit.

Figure 2:
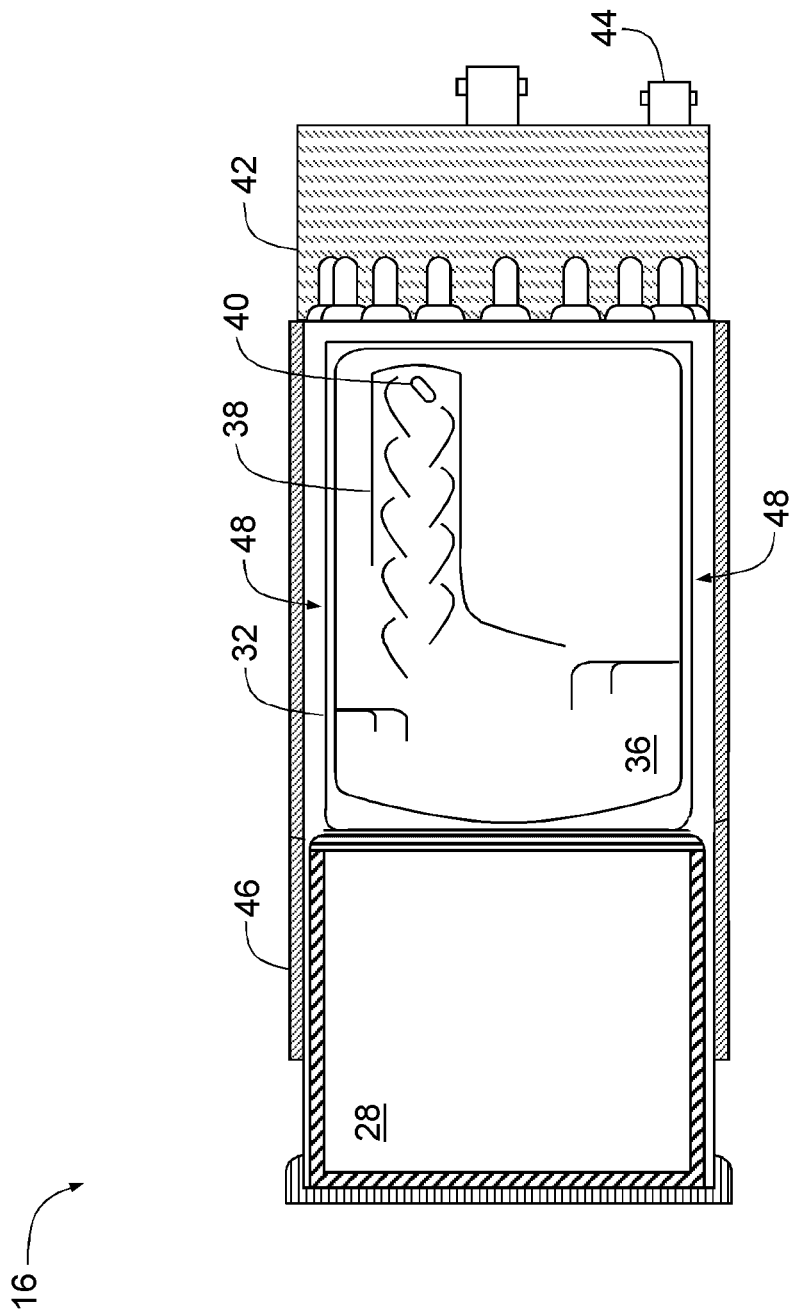
FIG. 2 is a view of the Sodium Iodide NaI(TI) gamma-ray detector of the apparatus of FIG. 1.

FIG. 2 is a schematic view of detector 16. When a gamma-ray is emitted by an atom in the material surrounding the oil well bore, having been excited by neutrons from neutron source 14, it may pass into detector 16 and, if so, its energy is transferred from the gamma-ray to electrons within the NaI (Tl) crystal 28. Upon the emission of ultra-violet photons the electrons lose this energy, promoting electrons within the crystal to excited states. Upon the emission of ultra-violet photons the electrons decay to lower energy states. The aforementioned ultra-violet photons pass through the optical window to the photocathode 36 of the photomultiplier tube 32 where they are converted into photoelectrons and subsequently multiplied by an electron multiplier 38 before arriving at the anode 40 of the photomultiplier tube 32. A further multiplication stage may be provided by an on-board pre-amplifier 42. In this manner an electrical signal, whose amplitude is proportional to the energy of the incident gamma-rays, is present at the detector output terminals 44 of detector 16. It will also be appreciated that the detector may additionally include a mu metal magnetic shield 46 located about the sides 48 of photomultiplier tube 32 and extending forwardly of the photomultiplier tube 32 sufficiently far to surround a portion of the NaI(Tl) crystal 28.

Scintillation detectors of this kind have high efficiencies, that is, exhibit a high probability of detecting an incident gamma-ray. However, they also exhibit a relatively long detector response time. The detector response time is the time required by the detector to detect an incident gamma-ray and return to a state where the next incident gamma-ray can be accurately detected. Radiation detectors with long detector response times are thus prone to pulse pile-up. That is, the output, which ideally consists of completely discrete pulses each corresponding to the incidence of a single gamma-ray, instead exhibits a waveform in which individual pulses can overlap making them difficult to characterize.

Figure 3A:
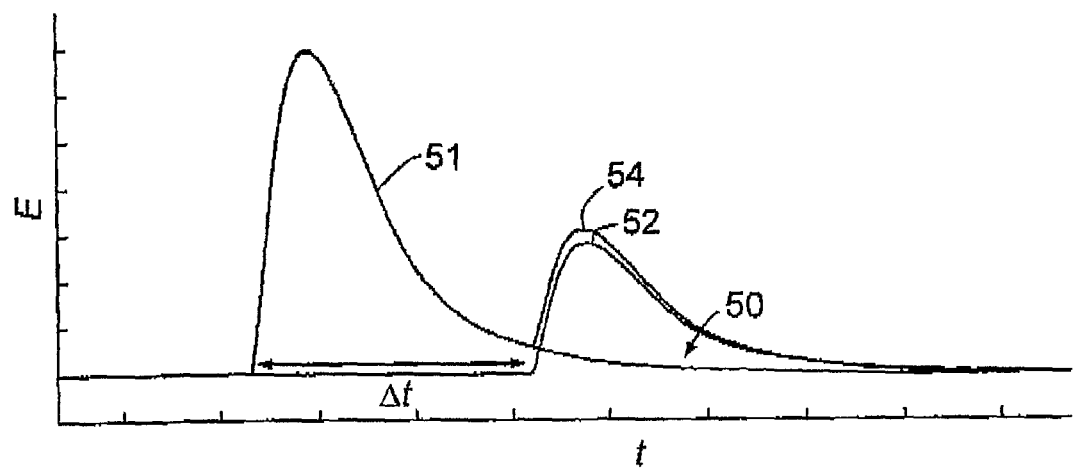
FIGS. 3a, 3b and 3c are graphs illustrating pulse pile-up.
Figure 3B:
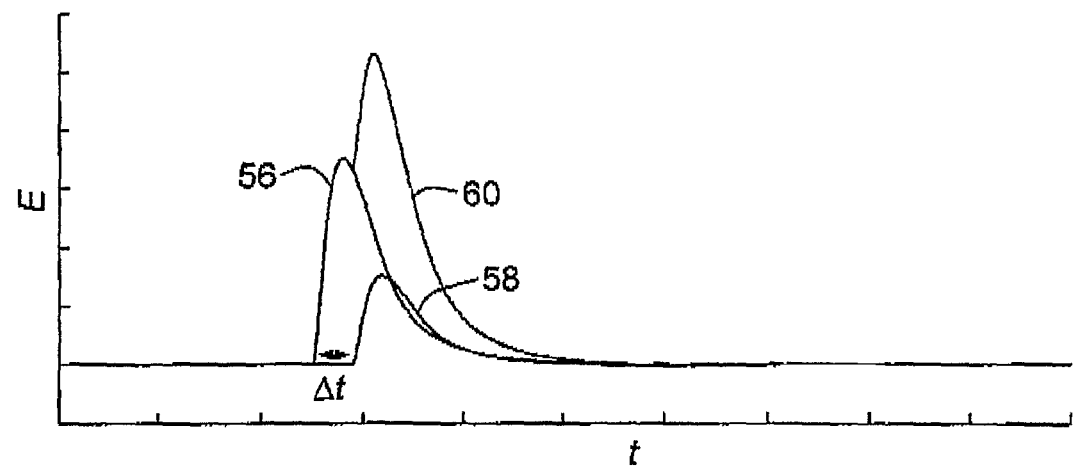
Figure 3C:
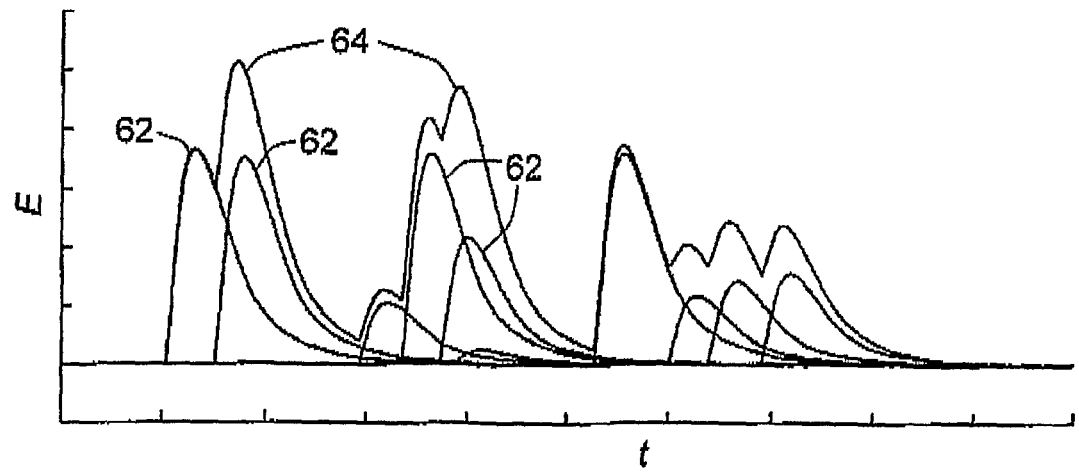

FIGS. 3a, 3b and 3c illustrate the effect of pulse pile-up, and show illustrative signals or pulses plotted as energy E versus time t (both in arbitrary units). FIG. 3a illustrates so-called 'tail-end pile-up' where, depending on the type of pulse conditioning employed, the tail 50 of one pulse 51 can provide a significant positive or negative bias positive in the illustrated example to the amplitude of a subsequent pulse 52. Although the time displacement between the two pulses, $\Delta t$, is relatively large when compared with the overall time interval for which the pulses prevail, the signal envelope or resultant waveform 54 is significantly above zero at the arrival of the second pulse 52.

The absence of a true zero signal state between the two pulses corrupts the pulse characterization, as the amplitude of the second pulse is falsely inflated by the tail of the first. FIG. 3b illustrates another form of pulse pile-up, 'peak pile-up'. Here two pulses 56 and 58 arrive closely spaced in time i.e. the time displacement $\Delta t$ between the pulses is small compared with the overall time interval over which the pulses prevail. The resultant output waveform 60 appears more or less as a single pulse of somewhat greater amplitude than either of the component pulses. In situations where the flux of gamma-rays through the detector is extreme, it is not uncommon to have multiple events arriving within the response time of the detector leading to multiple pile-up events. Such a case is illustrated by FIG. 3c. Multiple signals or pulses (such as those shown at 62) arrive with random time separation $\Delta t$ and sum to produce a resultant waveform 64 from which the parameters of the component signals are difficult to extract.

One component of the method of addressing pulse pile-up according to this embodiment is the estimation of certain parameters of the signals or pulses; these parameters are the number, time-of-arrival and energy of all gamma-rays in the detector data stream. These parameters are estimated, according to this embodiment, by modeling the signals in the data stream mathematically. The model employed in this embodiment includes certain assumptions about the data and the apparatus, as are discussed below.

Figure 4:
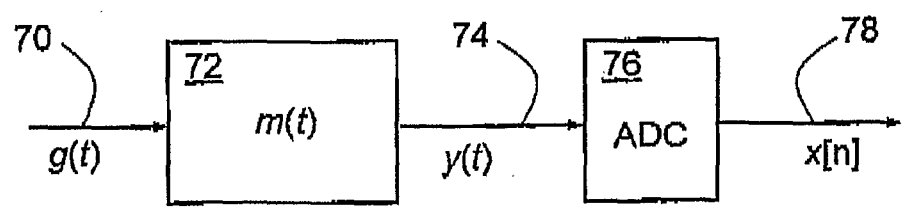
FIG. 4 is a diagram illustrating the mathematical modeling of radiation detection used by the signal processing method embodied in the apparatus of FIG. 1.

FIG. 4 is a diagram that illustrates the modeling of the radiation detection process. The radiation g(t) 70 is incident on the detector 72 represented by the measurement process m(t), resulting in output data from the detector y(t) 74. The addition of a sampling process 76 produces the digital detector data or 'time-series' x[n] 78.

Figure 5:
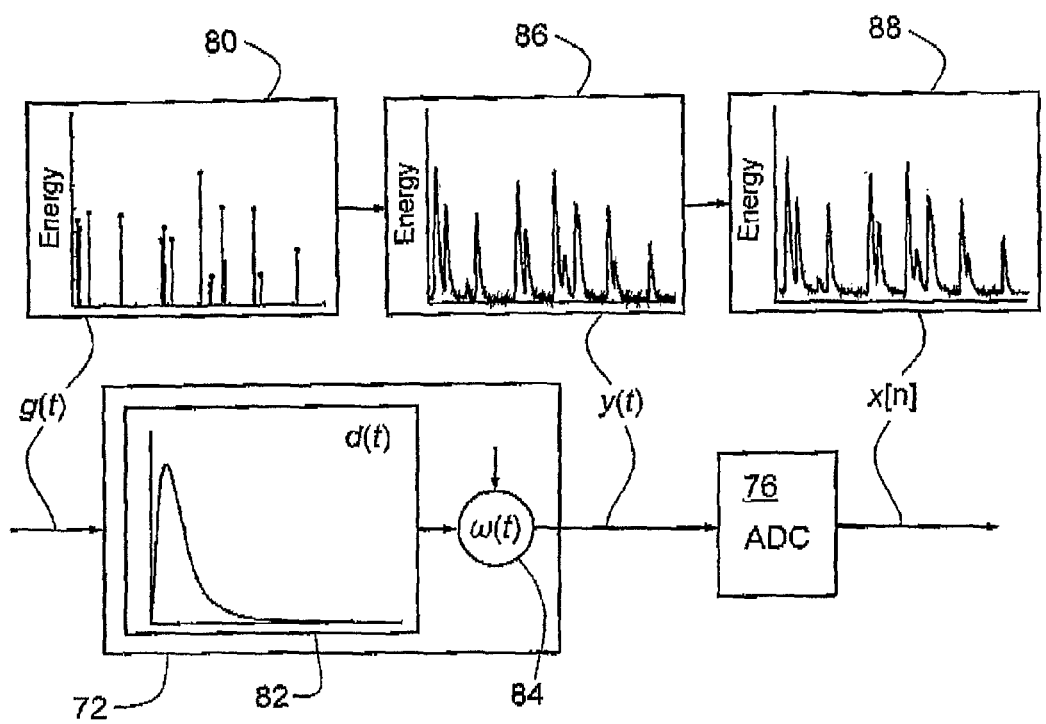
FIG. 5 is a diagram detailing the mathematical model of radiation detection used by the signal processing method embodied in the apparatus of FIG. 1.

It is possible to add to the above-described model some knowledge about the physical processes of radiation detection. FIG. 5 illustrates a more detailed mathematical model of the detection process shown in FIG. 4. The input g(t) to the detector is characterized by Equation 1, in which the input g(t) is assumed to be an unknown number (N) of delta-function-like impulses of random amplitude ($\alpha$) and time of arrival ($\tau$). An illustrative example of such input is shown at 80.

$$g(t) = \sum_{i=1}^{N} \alpha_i \delta(t - \tau_i) \quad (1)$$

$$i = 1, 2, 3, \ldots, N.$$

The radiation detector is assumed to have a specific response to the incoming radiation, referred to as the detector impulse response d(t) (or, equivalently, the signal form of the signals in the data), which is illustrated at 82. The digitized version of the detector impulse response (i.e. signal form) is denoted d[n].

The output from the detector is shown at 86 and characterized by Equation 2, in which the detector output y(t) is the sum of an unknown number of signals of predetermined signal form d(t), with unknown energy ($\alpha$) and unknown time of arrival ($\tau$). Sources of random noise $\omega$(t) 84 are also considered. The digital detector data x[n] 88 is produced by the analog to digital converter 76.

$$y(t) = \sum_{i=1}^{N} \alpha_i d(t - \tau_i) + \omega(t) \quad (2)$$

$$i = 1, 2, 3, \ldots, N.$$

The digitized signal x[n] (which constitutes a time series of data) at the output of the analog to digital converter 76, as illustrated at 88, is therefore given by $$x[n] = \sum_{i=1}^{N} \alpha_i d[n - \Delta_i] + \omega[n], \quad (3)$$

where d[n] is the discrete time form of the signal form d(t), $\Delta_i$ is the delay in samples to the ith signal, and $\omega$[n] is the discrete time form of the noise. The digitized signal x[n] may also be written in matrix form as $$x = A\alpha + \omega, \quad (4)$$

where A is an M×N matrix, the entries of which are given by $$A(n, i) = \begin{cases} d[n - \Delta_i] & \Delta_i \le n < \min(M, \Delta_i + T - 1) \\ 0 & \text{otherwise.} \end{cases} \quad (5)$$

Also, T is the length of d[n] in samples, M is the total number of samples in the digitized signal x[n], a is the vector of N signal energies, and w is the noise vector of length M. Matrix A may also be depicted as follows:

$$A = \begin{bmatrix} 0 & 0 & \cdots & 0 \\ \vdots & & & \\ 0 & \vdots & & \\ d[1] & & & \vdots \\ d[2] & 0 & & \\ \vdots & d[1] & & \\ d[T] & & & \\ 0 & \vdots & \ddots & 0 \\ & & & d[1] \\ \vdots & d[T] & & d[2] \\ & & & \vdots \\ 0 & \cdots & 0 & d[r < T] \end{bmatrix} \begin{matrix} \\ \\ \leftarrow \text{row}\Delta_1 \\ \\ \leftarrow \text{row}\Delta_2 \\ \\ \\ \leftarrow \text{row}\Delta_N \\ \\ \\ \end{matrix}$$

Thus, the columns of matrix A contain multiple versions of the signal form. For each of the individual columns the starting point of the signal form is defined by the signal temporal position. For example, if the signals in the data arrive at positions 2, 40, 78 and 125, column 1 of matrix A will have '0' in the first row, the 1st datum point of the signal form in the second row, the 2nd datum point of the signal form in the 3rd row, etc. The second column will have '0' up to row 39 followed by the signal form. The third column will have '0' up to row 77; the fourth column will have '0' up to row 124 and then the signal form. Hence the size of matrix A is determined by the number of identified signals (which becomes the number of columns), while the number of rows depends on the number of samples in the time series.

The signal processing method of this embodiment thus endeavors to provide an accurate estimate of some unknown parameters of the detector data, including not only the number of component signals (N) in the detector output but also the energy (a) and time-of-arrival (z) of each of the component signals.

Signal Processing Method

Figure 6:
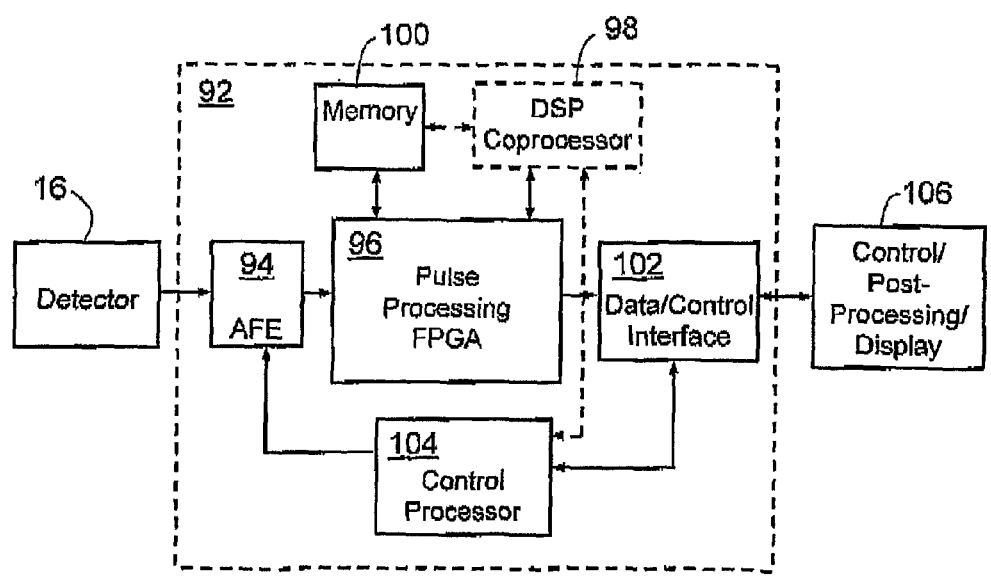
FIG. 6 is a schematic diagram of the functional elements of the data capture module of FIG. 1.

FIG. 6 is a schematic diagram of the functional elements of data capture module 26 of FIG. 1, with detector 16, and is provided to explain in more detail the signal processing method for pulse pile-up recovery employed by the apparatus of FIG. 1. Referring to FIG. 6, detector 16 is connected to a pulse processing board 92 via an analog front end (AFE 94). The purpose of the AFE 94 is to digitize the signal produced by detector 16 by performing analog to digital conversion at, in this embodiment, 125 MHz with 12-bit conversion accuracy.

Figure 7A:
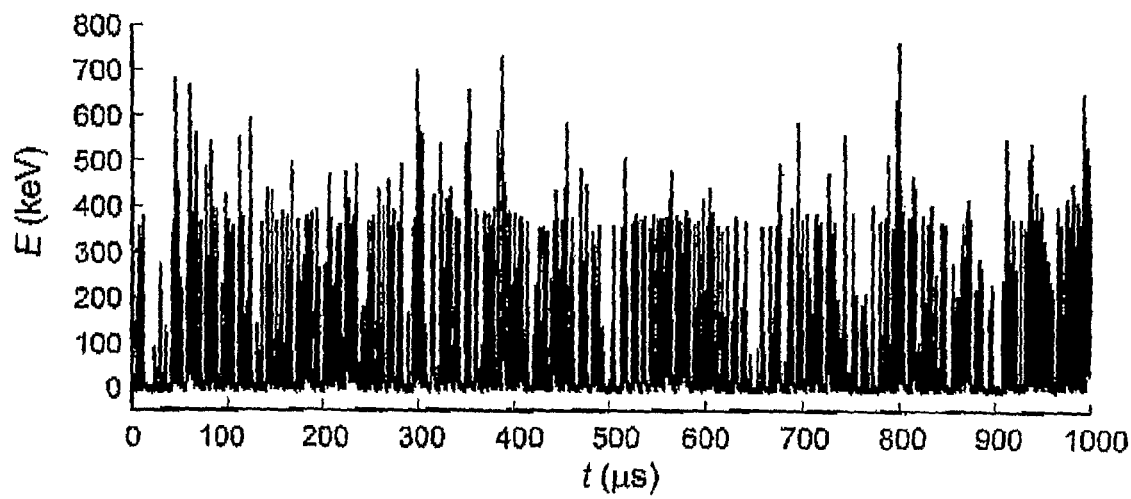
FIGS. 7a, 7b and 7c are plots of unprocessed digitized data collected directly from the output of the detector of FIG. 2 over time ranges of 1000 ms, 100 ms and 10 ms respectively.
Figure 7B:
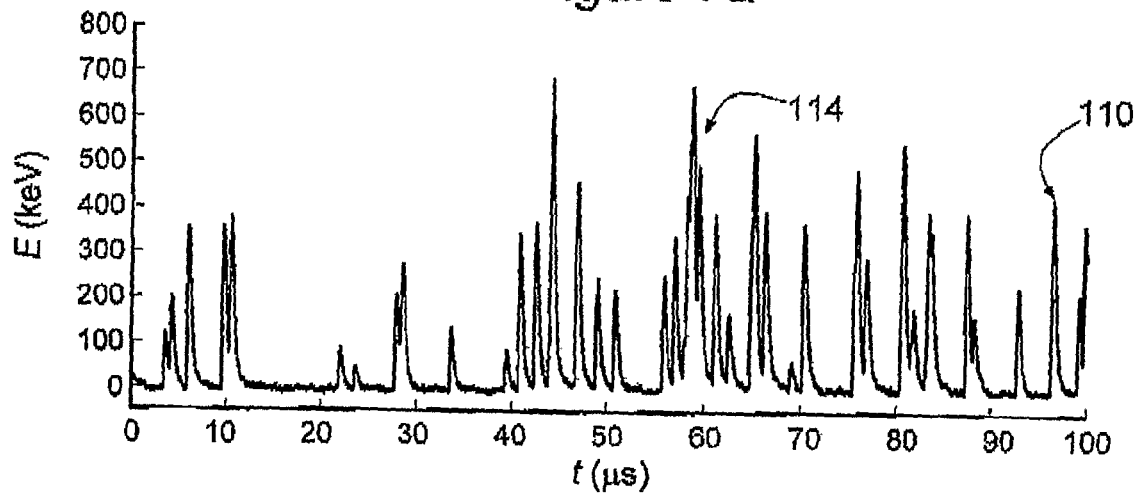
Figure 7C:
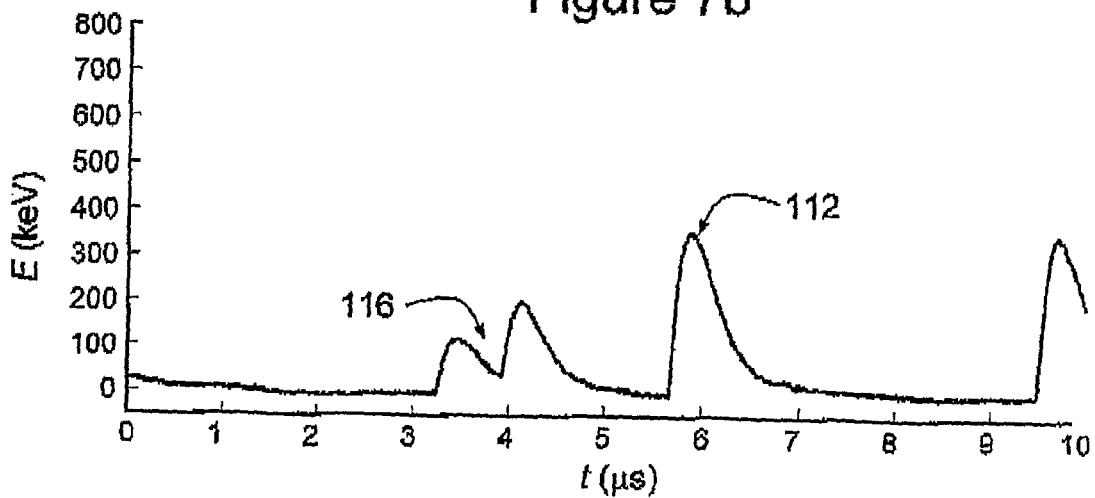

FIGS. 7a, 7b and 7c illustrate the waveform resulting from such digitization, over time ranges of 1000 microseconds, 100 microseconds and 10 microseconds respectively. The various peaks in these figures correspond to the detection of respective gamma-rays. Some peaks appear as discreet signals or pulses 110, 112 which may indicate the presence of only a single gamma-ray. Other peaks are due to the pile-up either of two peaks 116 or of three or more peaks 114.

After the output of detector 16 has been digitized by AFE 94, the signal processing method for pulse pile-up recovery is implemented. Referring again to FIG. 6, the digital signal produced by AFE 94 is passed into the pulse processing Field Programmable Gate Array (FPGA) 96. The pulse processing FPGA (96) then implements the pulse processing method of this embodiment; a digital signal processing coprocessor 98 may optionally be used to assist the pulse processing FPGA 96 to implement the pulse processing method. Variables required by the pulse processing FPGA 96 and data produced at interim steps of the pulse processing method are optionally stored in memory 100. The signal processing is controlled via a Data/Control Interface 102 which, in conjunction with a Control Processor 104, can be used to modify the implementation of the signal processing. The output data from the signal processing method can be displayed on a display 106 via the Data/Control Interface 102. Display 106 is provided in a computer that may, if desired, be used to perform post-processing and system control.

Figure 8:
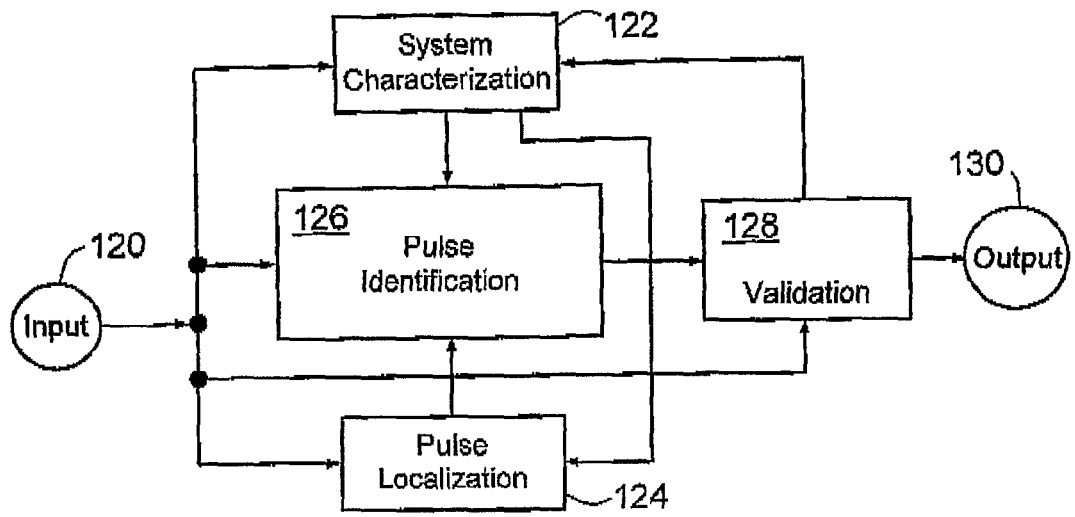
FIG. 8 is a schematic representation of the signal processing method for pulse pile-up recovery employed by the apparatus of FIG. 1 for analyzing spectroscopic data according to this embodiment of the invention.

FIG. 8 is a schematic diagram of the signal processing method for pulse pile-up recovery of radiation signals in the detector time series of this embodiment. The digitized detector signal (from AFE 94) forms the input 120 for this signal processing method. Offline System Characterization 122 is used to determine the detector impulse response unique to the particular digitized detector signal. Characterization data generated in System Characterization phase 122 is use in a Pulse Localization phase 124. The Pulse Localization phase 124 estimates, in real-time, the number and temporal position (or time-of-arrival) of radiation pulses within the digitized detector signal. In a Pulse Identification phase 126, the digitized detector signal, the detector impulse response and the output from the Pulse Localization phase 124 are used to determine the energy of the signals or pulses. Validation 128 involves comparing the output of the Pulse Identification phase 126 with the digitized detector signal 120. If this comparison indicates that any of the pulse parameters have been estimated inaccurately, those parameters are rejected so that only valid data is output 130. The error signal generated in the Validation phase 128 is also employed in System Characterization 122. In circumstances where the detector impulse response may change over time, such as owing to the aging of components, temperature variations or increased radiation fluxes, System Characterization 122 updates the detector impulse response online and adaptively by employing the error signal. Such updating of the detector impulse response may be performed with any suitable adaptive method, such as least mean squares adaptation, normalized least mean squares adaptation or recursive least squares adaptation as described, for example, by S. Haykin [*Adaptive Filter Theory*, 4th Ed, Prentice Hall, 2002].

Figure 9:
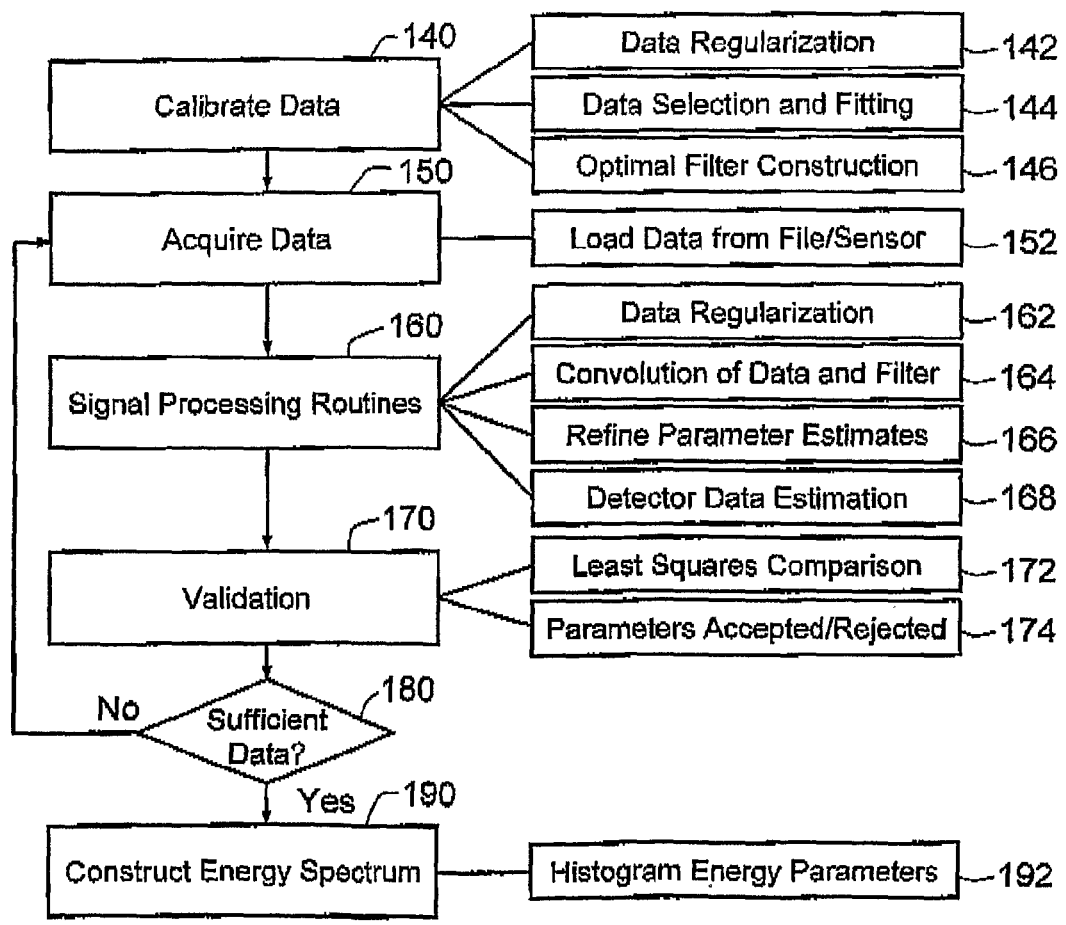
FIG. 9 is a schematic flowchart of the signal processing method for pulse pile-up recovery employed by the apparatus of FIG. 1 for analyzing spectroscopic data according to this embodiment of the invention.

FIG. 9 is a flow diagram of the signal processing method of this embodiment. At step 140, calibration is performed. This involves Data Regularization or Conditioning 142, Data Selection and Fitting 144 and Optimal Filter Construction 146. In Data Regularization 142, calibration data signals recorded at a low incident radiation flux are loaded from data files, the integrity of these calibration data is checked and any bias in the baseline of the data removed. Data Selection and Fitting 144 involves selecting only that data corresponding to the detection of single radiation events and constructing a data based model of the detector impulse response. A functional form of this model is then obtained by fitting a suitable function to the data, such as a polynomial, exponential or spline function. This results in the expected impulse response of the detector d[n]. Optimal Filter Construction 146 employs this detector impulse response to construct a suitable filter for the detector, such as an inverse filter or a matched filter.

At step 150 data is acquired, but may be affected by significant pulse pile-up. The data may be input 152 either from a file or directly from the detector elements 16.

At step 160 signal processing routines are applied to determine the amplitude and timing parameters of the signals in the time series. Firstly the data is conditioned 162 to remove any bias in the baseline of the data. Next, the detector data is convoluted 164 with the filter derived in step 146 to provide an initial estimate of the time-of-arrival parameters ($\tau$) and number of pulses (N). The timing parameters and estimate of the number of pulses are then further refined 166 using a suitable peak detection process, and the energy parameter ($\alpha$) is determined from $\tau$, N and the detector impulse response d[n] (such as by linear programming, matrix inversion or convolution techniques). Finally, from the number (N), energy ($\alpha$), timing ($\Delta_t$) and detector impulse response (d[n]), an estimate of the detector data stream ($\hat{x}$<[n]) is made 168.

The parameter vector ($\alpha$) may be determined by linear programming or by solving the system of linear equations defined in Equation 4 using a suitable method for solving such systems of equations, such as one of those described, for example, by G. H. Golub and C. F. Van Loan [*Matrix Computations*, 2nd Ed, Johns Hopkins University Press, 1989].

At step (170) the validation phase 128 referred to above is performed, which may be referred to as error checking as, in this embodiment, validation involves determining an error signal e[n], computed successively for the set of samples corresponding to each signal i where 1<i<N (N being the total number of signals in the data stream). This error signal is calculated by determining 172 the squares of the differences between the time series data x[n] and the model based datastream ($\hat{x}$[n] from step 168); e[n] is thus the square of the difference between x[n] and $\hat{x}$[n], as given in Equation 6.

$$e[n]=(x[n]-\hat{x}[n])^2 \qquad (6)$$

If e[n] exceeds a predetermined threshold, these parameters are rejected 174 as this condition indicates that the signal parameters do not produce a model of the respective signal that acceptably conforms to that signal (that is, is sufficiently accurate); the relevant signal is deemed to constitute corrupted data and excluded from further spectroscopic analysis. The threshold may be varied according to the data and how closely it is desired that the data be modeled; generally, therefore, in any particular specific application, the method of validation and definition of the threshold are chosen to reflect the requirements of that application.

One example of such a threshold is the signal energy a, multiplied by a suitable factor, such as 0.05. Validation will, in this example, deem that the model acceptably conforms to the data constituting signal i when:

$$e[n]>0.05\alpha_i \qquad (7)$$

Validation may be performed by defining the error signal and threshold in any other suitable way. For example, the error signal may be set to the absolute value of the error. The threshold may be defined to be a multiple other than 0.05 of the signal amplitude. Another threshold comprises a number of noise standard deviations.

Decreasing the threshold (such as by decreasing the coefficient of a, in Equation 7) enables improved energy resolution at lower throughput, while increasing the threshold enables improved throughput at reduced energy resolution.

At step 180 a decision is made as to whether there is sufficient data. If not, processing continues at step 150. Otherwise, the method proceeds to step 190. At step 190 a gamma-ray energy spectrum is created. The gamma-ray energy parameters determined at step 166, which were deemed to be of sufficient accuracy at step 174, are represented 192 in the form of a histogram. This is the gamma-ray energy spectrum on which spectroscopic analysis may be performed.

Results of Signal Processing Method

Figure 10A:
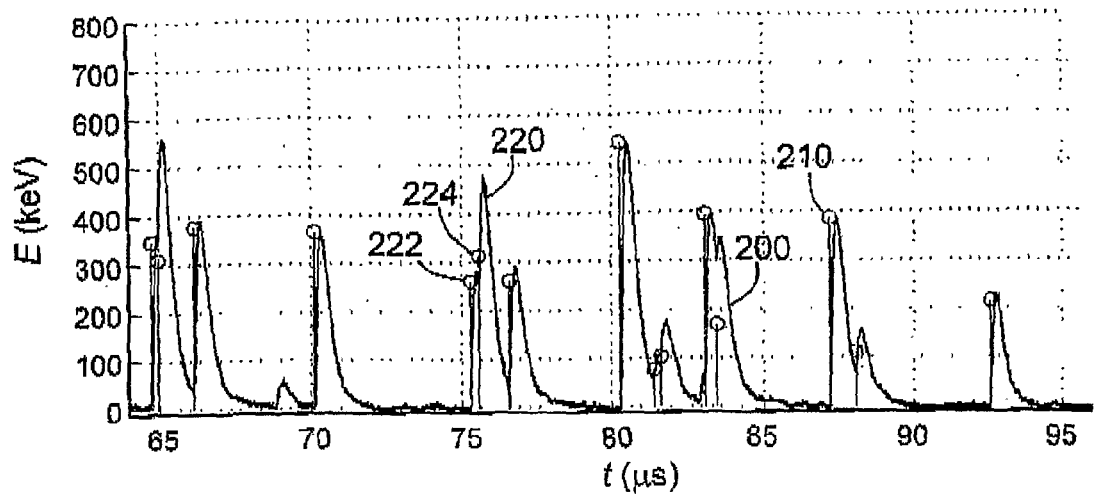
FIGS. 10a, 10b and 10c are plots of the results at different stages of the signal processing method of FIG. 9.
Figure 10B:
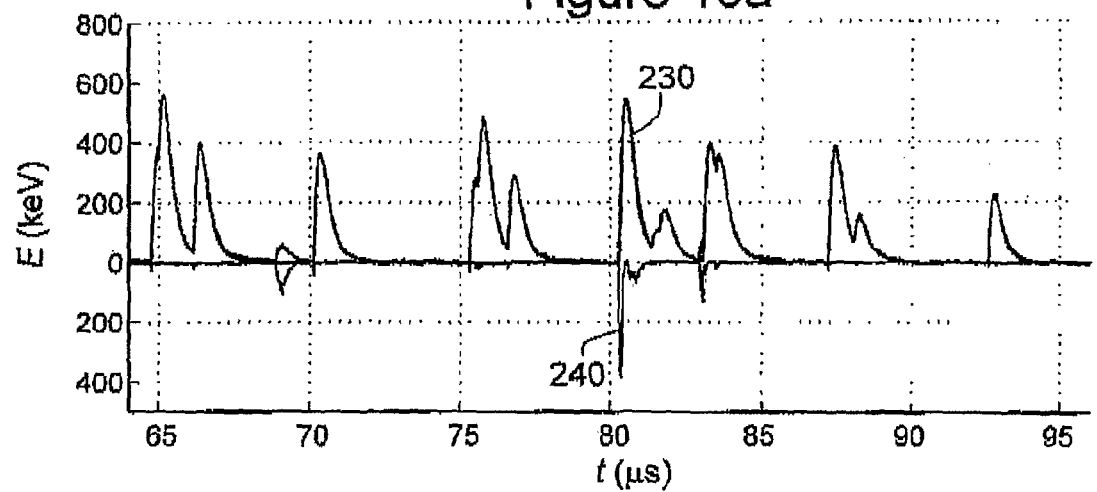
Figure 10C:
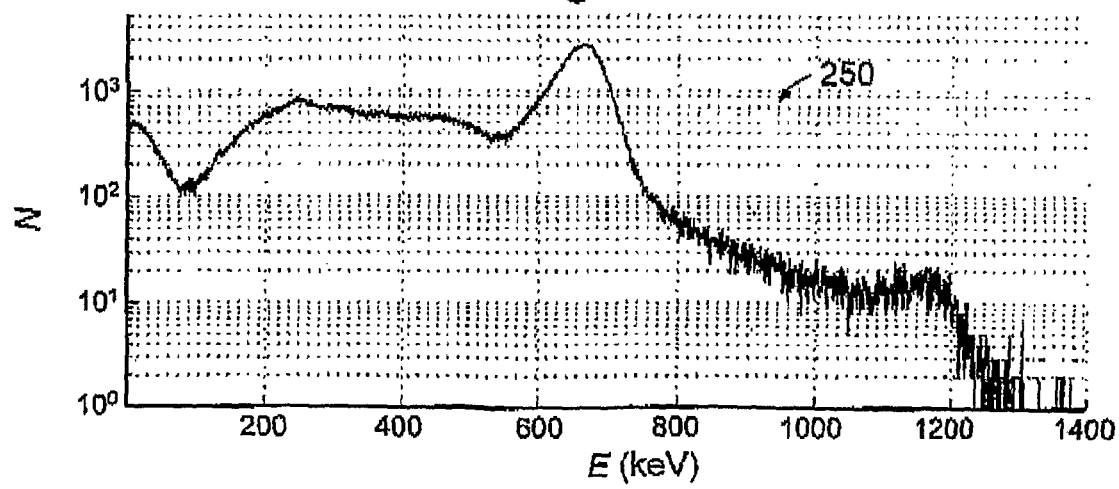

FIGS. 10a, 10b and 10c are plots of the results at various stages of processing of the digital signal processing method described above by reference to FIGS. 8 and 9, for digitized data collected with a scintillation gamma-ray detector. The detector data stream was digitized by an analog to digital converter at 125 MHz and 12 bit accuracy; the gamma-ray source used was a 137Cs source with a primary gamma-ray emission of 661.7 keV.

Scintillation detectors employ light generated by the detector/radiation interaction to detect and measure that incident radiation. A scintillation detector may comprise organic scintillators or inorganic scintillators. Organic scintillators include both organic crystalline scintillators and liquid organic solutions (where the scintillating material has been dissolved to form a liquid scintillator, which can then be plasticized to form a plastic scintillator. Inorganic scintillators include crystalline scintillators such as NaI(TI), BGO, CsI(TI) and many others, and photo switch detectors (in which a combination of two or more dissimilar scintillators are optically coupled to a common PMT to exploit the differing decay times of the scintillators to determine where a radiation/detection interaction has occurred).

In this example the detector comprised a 76 mm×76 mm NaI(TI) gamma-ray scintillation detector. FIG. 10a is a plot of a portion of the digitized detector data 200 prior to processing by the signal processing method plotted as energy E(keV) versus time t(p), together with the results (for example, at 210) of the signal processing method plotted in terms of the temporal position and energy of the component signals. For example, what may appear to be a single peak 220 in the original digitized detector data 200 at approximately 75.8 μs has been resolved into two distinct signals 222, 224 at respectively 75.3 and 75.7 μs.

From the determined temporal positions, energies and forms of the signals it is possible to generate a model of the detector data. FIG. 10b is a plot of the resulting data model 230, shown as energy E(keV) versus time t(p), of that portion of the digitized detector data stream 200 shown in FIG. 10a. An inverted error plot 240, comprising a plot of the squares of the differences between the detector data 200 and the data model 230, is also shown, and indicates the error in the model 230. The error signal is small where the model 230 has tracked the output of the detector accurately, but the error becomes large when there are inconsistencies between the model 230 of the detector data and the detector data 200 itself. Based on this error signal 240, a decision can be made as to whether to accept or reject the signal parameters estimated by the signal processing method.

FIG. 10c is a gamma-ray energy spectrum 250 shown as a log-linear plot, produced by the signal processing method. The energy parameters that have been accepted are plotted as a histogram, where the horizontal axis represents the energy E(keV) of each signal in a respective bin, and the vertical axis represents the number of counts N of that energy determined to have been detected in the collection period (in this example, 1 s).

Figure 11:
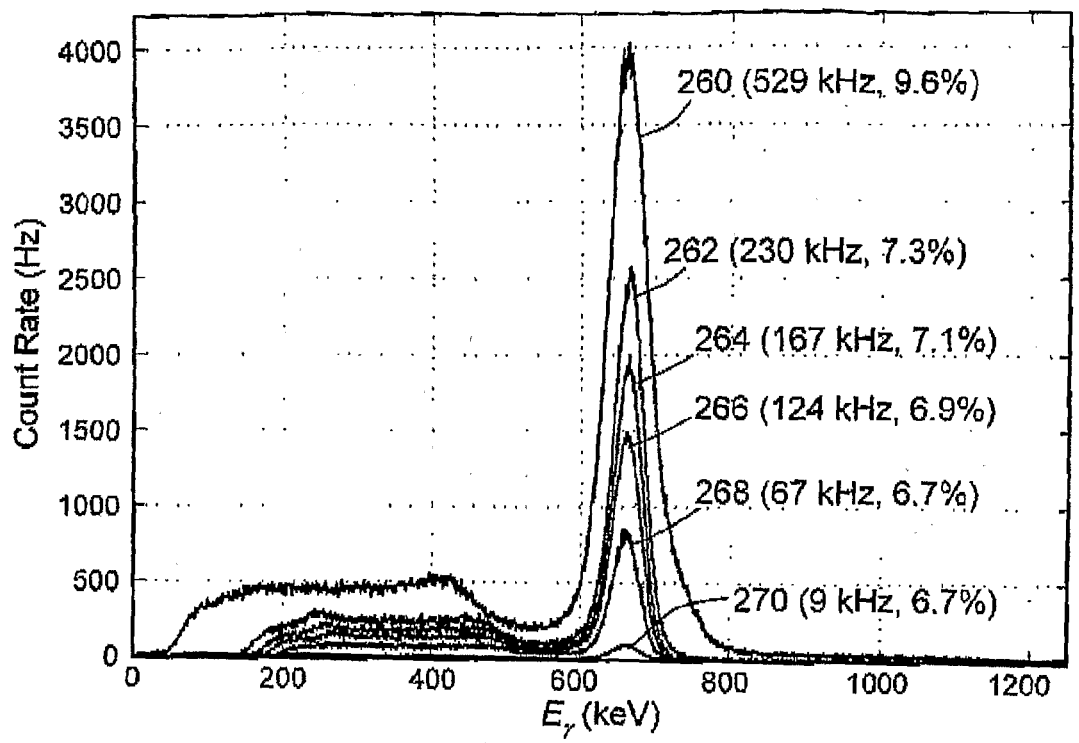
FIG. 11 are plots of gamma-ray spectra for a 137Cs source at various input count rates, processed with the method of FIG. 9.

FIG. 11 is a plot of exemplary gamma-ray energy spectra, collected using a sodium iodide NaI(TI) gamma-ray detector. The gamma-ray energy spectra shown in FIG. 11 demonstrate the performance of the signal processing method for pulse pile-up recovery at a range of count rates. The experimental data were collected using a 76 mm×76 mm Canberra brand NaI(TI) gamma-ray detector (model number 802) coupled to a detector base (model number 2007); no preamplifier was used. The signal processing hardware was connected to the dynode output of the detector base via a 65 MHz 14-bit analog to digital converter.

The NaI(TI) crystal was irradiated with a collimated gamma-ray beam, which ensured that the central portion of the detector was illuminated with an essentially parallel beam of gamma-rays; the beam diameter was 50 mm.

Two 137Cs gamma-ray sources of 0.37 GBq and 3.7 GBq, in combination with three calibrated aluminium transmission filters, were used to obtain a range of gamma-ray fluxes at the detector face. The detector to source distance remained constant during data collection.

Referring to FIG. 11, the spectra 260, 262, 264, 266, 268 and 270 were collected at count rates of respectively 529 kHz, 230 kHz, 167 kHz, 124 kHz, 67 kHz and 9 kHz. As would be expected, the energy resolution of the data collected with the apparatus and processed with the method of this embodiment deteriorated as the count rate increased. Expressed as a percentage of the peak energy (i.e. 661.7 keV), the full width at half maximum (FWHM) of the peak was found to be, respectively, 9.6% 7.3%, 7.1%, 6.9%, 6.7% and 6.7%. For count rates of 9 kHz to 230 kHz, the energy resolution of the 137Cs gamma-ray energy peak at 661.7 keV remained less than 7.5%; that is, despite more than a 25 fold increase in the count rate from the NaI(TI) detector, the energy resolution at 661.7 keV decreased by less than 0.5%.

Figure 12:
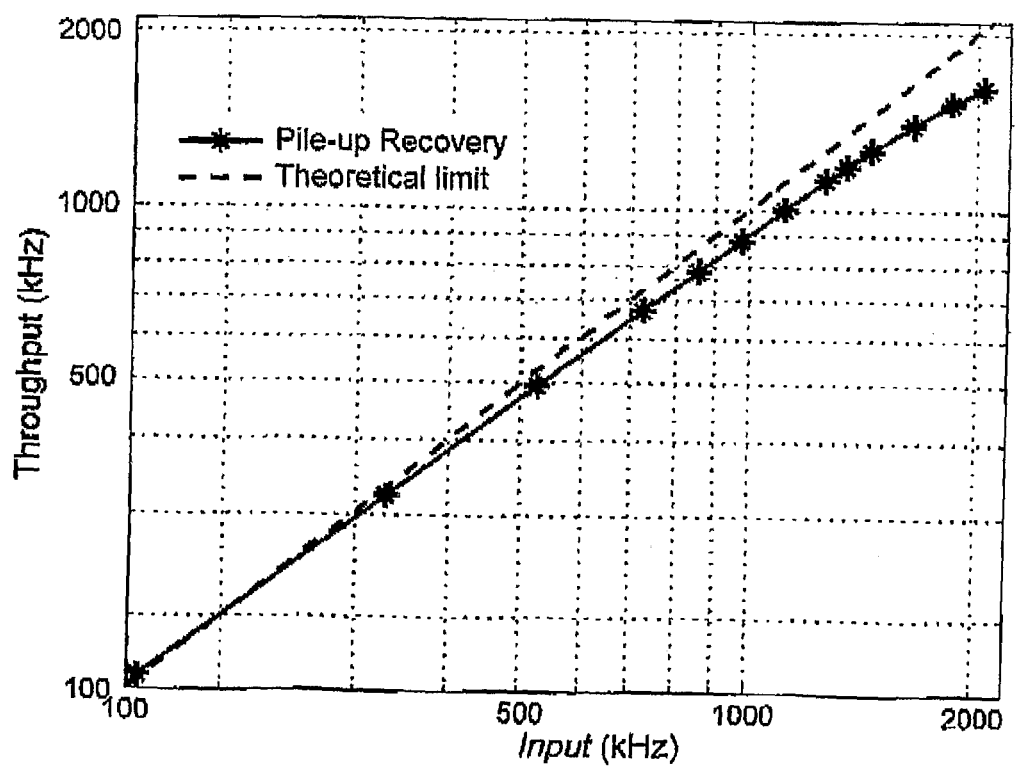
FIG. 12 is a plot of the results of a computer simulation of the signal processing method of FIG. 9 prepared using a simulated data set produced by a digital nuclear pulse generator.
Figure 13:
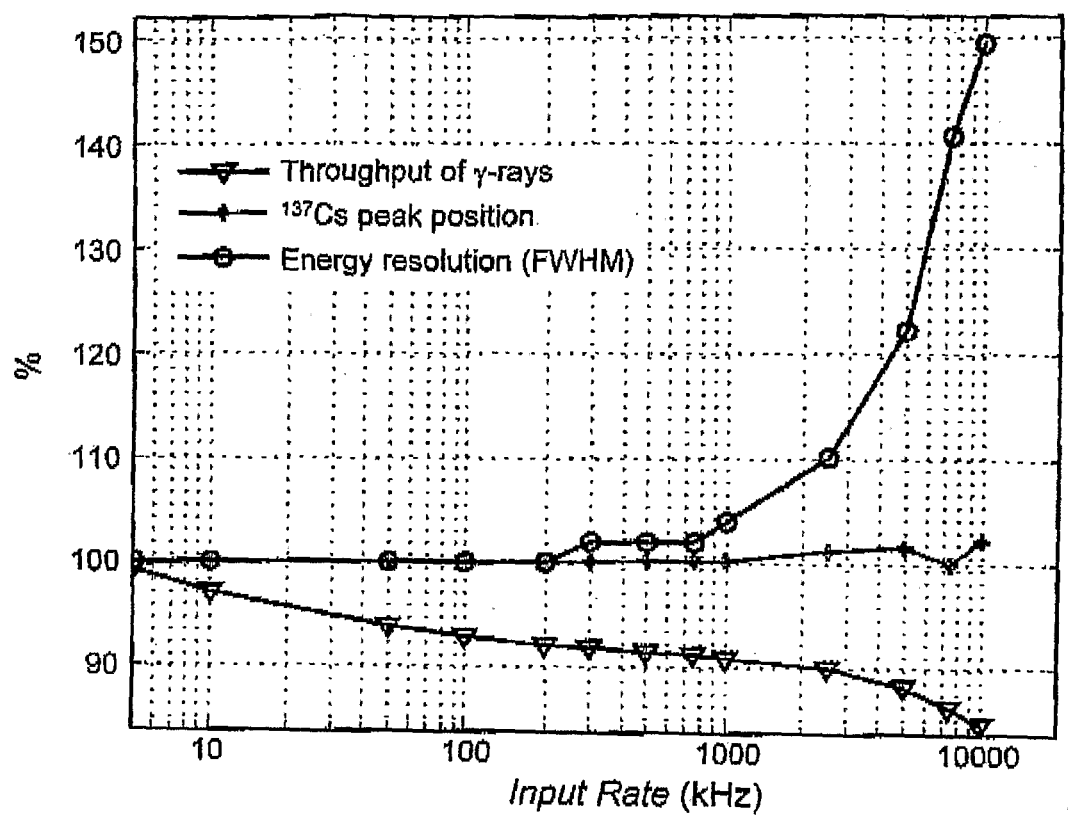
FIG. 13 is plot of the performance of the simulation of FIG. 12 for a gamma-ray source over a range of count rates.

The performance of the signal processing method of this embodiment is also illustrated in FIG. 12 and FIG. 13. These two figures were generated from the results of a computer simulation, in which the input count rate could be accurately controlled hence enabling a very wide range of input count rates to be considered. FIG. 12 is a log-log plot of the throughput of the signal processing method (i.e. that portion of the input count rate accurately detected) against input count rate from 0.1 to 2.5 MHz. The theoretical limit (i.e. where the throughput equals the input) is shown with a dashed line. This figure demonstrates that, over a very wide range of input count rates, the throughput of the signal processing method remains greater than or equal to 90%.

FIG. 13 is a linear-log plot comparable to FIG. 12 but with percentage throughput plotted against input count rate from 0.005 to 10 MHz. In addition, FIG. 13 includes plots of the energy resolution and peak position performance of the signal processing method of this embodiment. The energy resolution of the 137Cs peak degrades by less than 10% over 0 to 2.5 MHZ, and the peak position shows very little change over that range.

FIGS. 14a, 14b, 14c and 14d also depict the results of applying the signal processing method for pulse pile-up recovery of this embodiment to the output of a 76 mm×76 mm NaI(TI) gamma-ray detector. Approximately 14 μs of data was used to generate the data plotted in these figures. The figures are plots of energy E in arbitrary units against time t(μs).

Figure 14A:
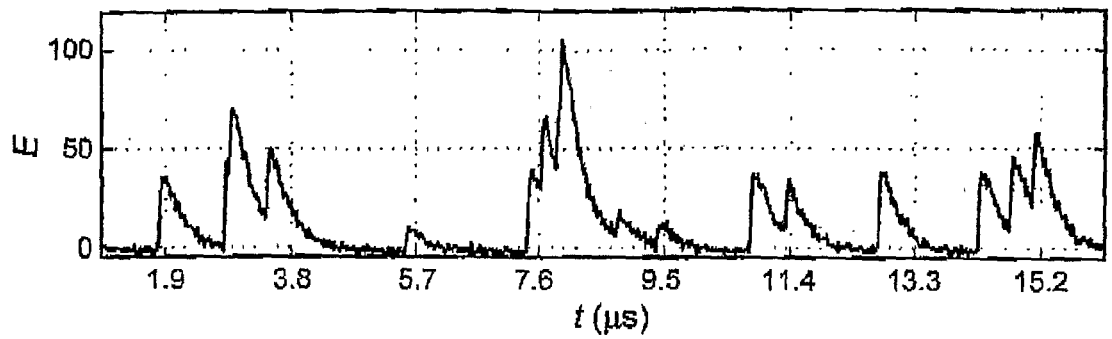
FIGS. 14a, 14b, 14c and 14d depict the results of applying the signal processing method of FIG. 9 to the output of a 76 mm×76 mm NaI(TI) gamma-ray detector.
Figure 14B:
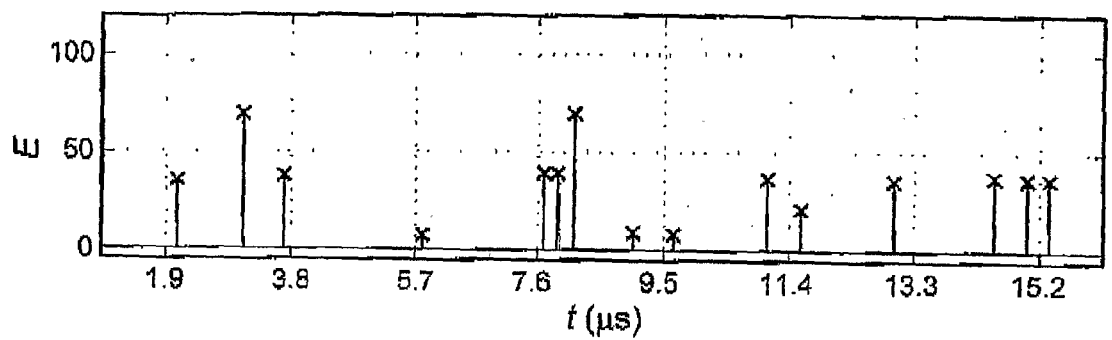
Figure 14C:
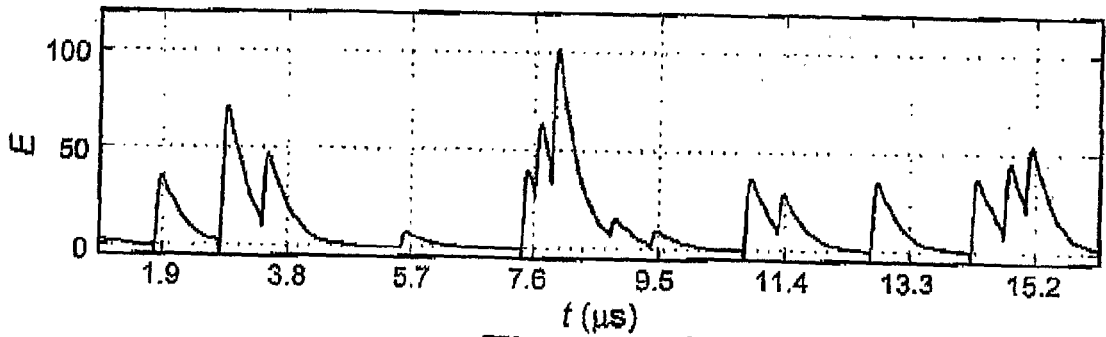
Figure 14D:
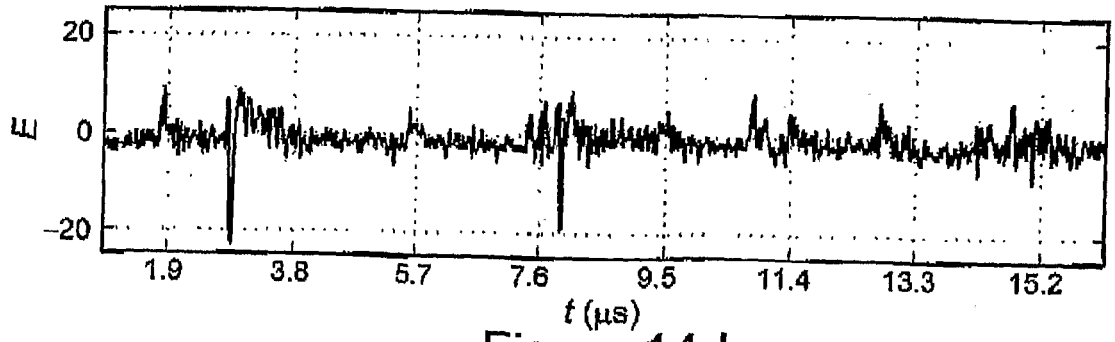

FIG. 14a is a plot of the output of AFE 94: an analog to digital conversion rate of 65 MHz and 14 bit resolution was used to covert the time varying voltage output of the detector to digital data. FIG. 14b is a plot of the results of applying the method. The temporal positions of the signals (depicted as vertical lines) have been resolved, as have the energies of the component signal (depicted as crosses). The temporal position and the energy of the component signal were used as described above, in conjunction with the signal form, to determine a model of the gamma-ray detector output: the resulting model is plotted in FIG. 14c.

The digitized output of the gamma-ray detector was compared with the model of the gamma-ray detector output to derive an estimate of the error made in characterizing the gamma-ray detector output. This error signal is plotted in FIG. 14d. It is then possible, on the basis of this error signal, to determine thresholds for the exclusion of signal parameter estimates, such as the decision to accept or reject an estimate of signal energy may be determined by the magnitude or the error near the position of a signal peak.

FIGS. 15a, 15b, 15c and 15d depict the results of applying the signal processing method for pulse pile-up recovery of this embodiment to data collected with a semiconductor (or solid state) detector. Such detectors employ the interaction of incident radiation with the electrons in the crystalline lattice of the semiconductor, forming electron hole pairs. Examples of these detectors include High-Purity Germanium (HPGe) detectors, Silicon Diode detectors, semiconductor drift detectors (such as Silicon Drift detectors), Cadmium Telluride (CdTe) detectors and CZT detectors.

Figure 15A:
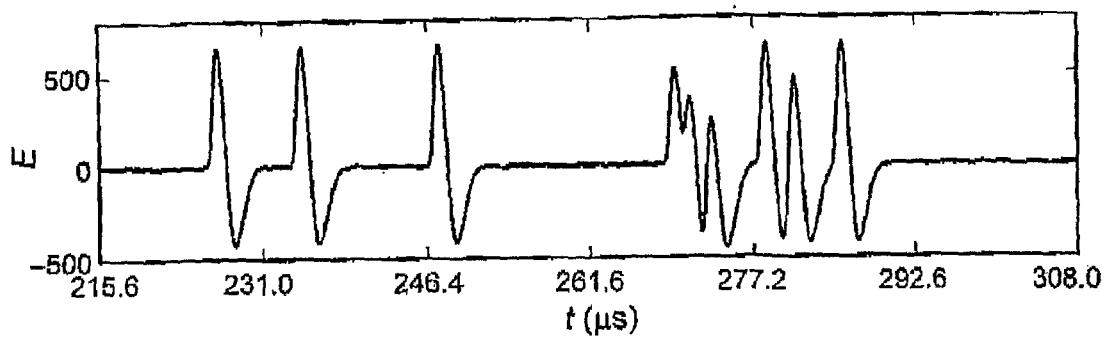
FIGS. 15a, 15b, 15c and 15d depict the results of applying the signal processing method of FIG. 9 to data collected with a HPGe detector.
Figure 15B:
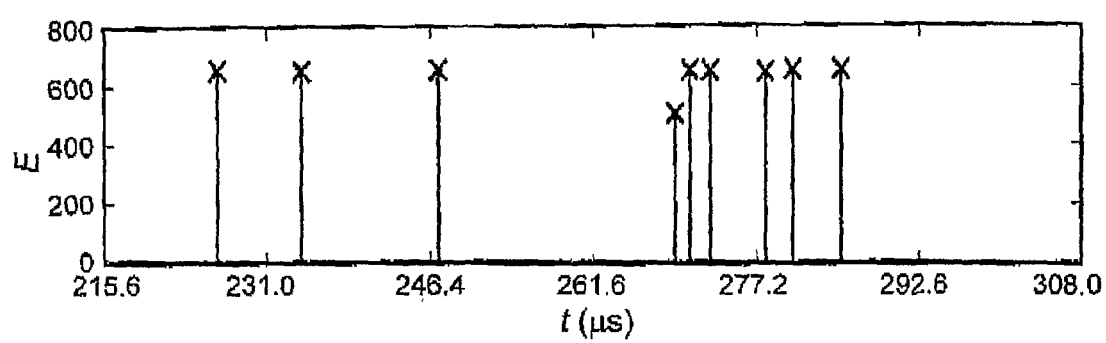
Figure 15C:
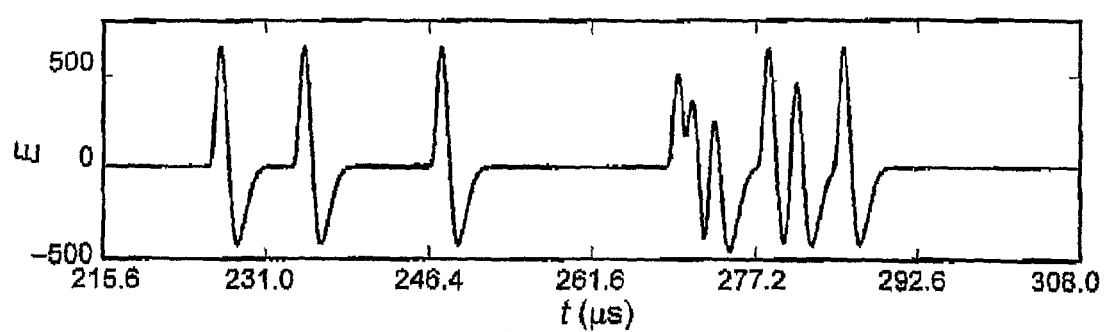

Hence, the apparatus of FIG. 1 was employed, though with a detector unit in the form of a Canberra Industries brand High Purity Germanium (HPGe) detector substituted for detector 16, and with a 57Co gamma-ray source (whose two principal gamma-rays have energies of 122.1 and 136.5 keV) rather than a neutron source and specimen. The output of the HPGe detector was fed through a pre-amplifier and then into an Ortec brand pulse shaping amplifier. Approximately 92 µs of data was collected, from which was generated the data plotted in FIGS. 15a, 15b, 15c and 15d as energy E in arbitrary units against time t(p). FIG. 15a is a plot of the output of AFE 94. The time varying voltage output of the detector was converted to digital data at an analog to digital conversion rate of 65 MHz with 14 bit resolution. FIG. 15b is a plot of the results of applying the method. The temporal positions of the signals (depicted as vertical lines) have been resolved, as have the energies of the component signal (depicted as crosses). The temporal position, the energy of the component signal and the signal form were used to determine a model of the processed HPGe detector output, which is plotted in FIG. 15c.

Figure 15D:
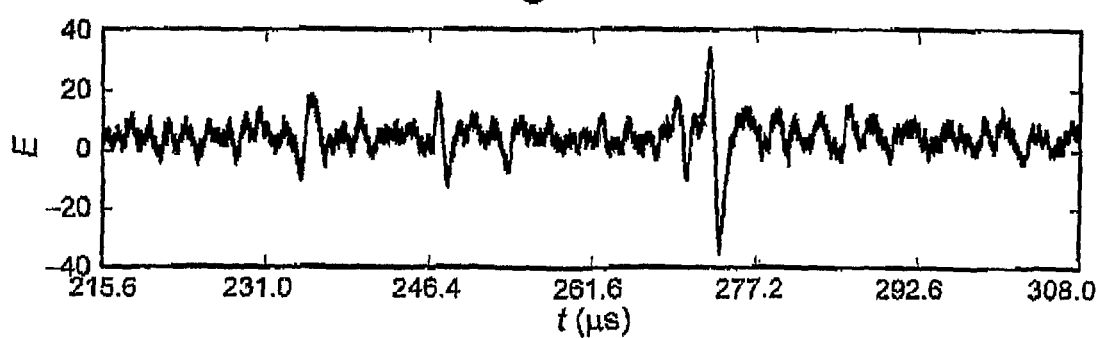

FIG. 15d is a plot of the error signal, derived from a comparison of the digitized processed output of the HPGe detector and the model of that output. This error signal can again be used to determine thresholds for the exclusion of signal parameter estimates.

FIGS. 16a, 16b, 16c and 16d depict the results of applying the signal processing method for pulse pile-up recovery of this embodiment to the output of a gas proportional detector used for detecting X-rays. Gas proportional detectors are a class of detector whose behavior is similar to that of solid state detectors. Gas proportional detectors rely on the interaction of the radiation with a gas in a chamber. An electric field is created in the chamber between an axial wire and the walls of the chamber. Radiation passing through the gas ionizes the gas, which produces electrons that then collect on the wire owing to the electric field, and are output as the detector data.

Thus, apparatus 10 of FIG. 1 was employed, though with a detector in the form of a Xenon gas proportional detector substituted for detector 16, and with an X-ray generator from an X-ray diffraction apparatus rather than a neutron source and specimen. Approximately 300 µs of data was used to generate the data plotted in FIGS. 16a, 16b, 16c and 16d, which plot energy E in arbitrary units against time t(µs). A significantly longer data collection period was used compared with that of the previous examples, owing to the relatively long decay time of the xenon gas proportional detector (of the order of 50 µs or more). For this reason also the sampling rate of AFE 94 was reduced.

Figure 16A:
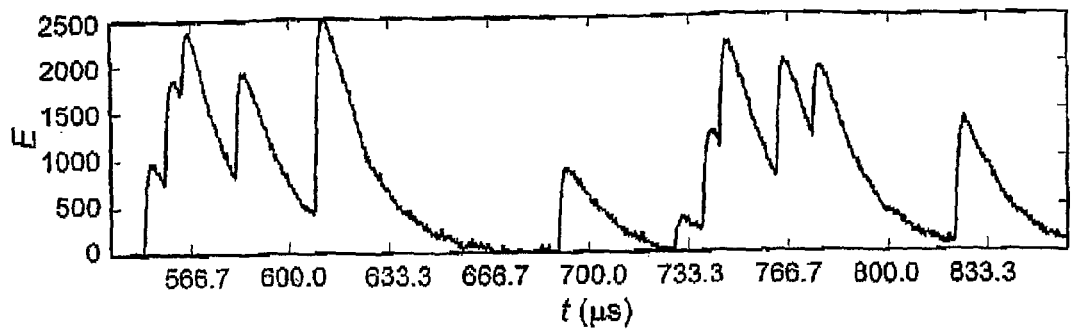
FIGS. 16a, 16b, 16c and 16d depict the results of applying the signal processing method of FIG. 9 to the output of a Xenon gas proportional detector.
Figure 16B:
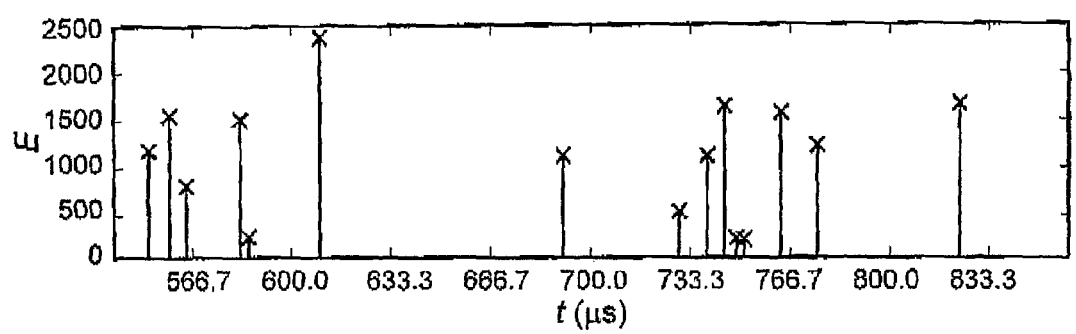
Figure 16C:
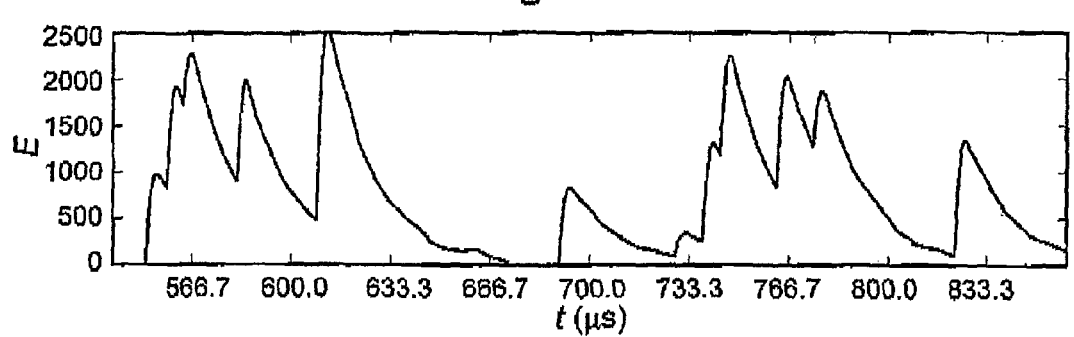
Figure 16D:
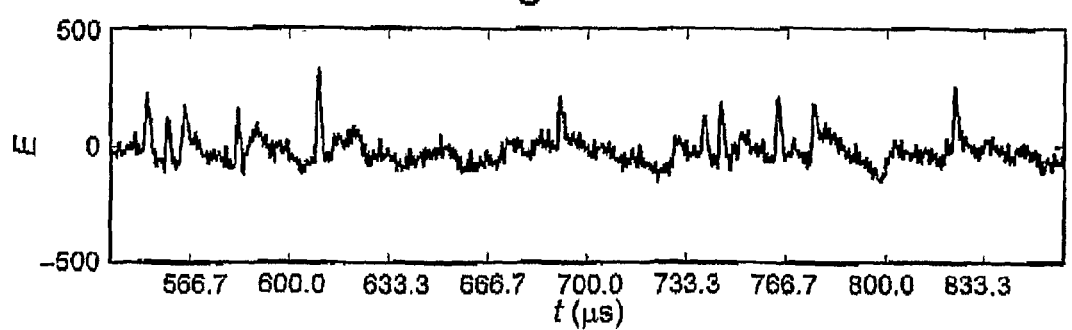

FIG. 16a is a plot of the output of AFE 94; in this example an analog to digital conversion rate of 15 MHz and 14 bit resolution was used to covert the time varying voltage output of the detector to digital data. FIG. 16b is a plot of the results of applying the method. The temporal positions of the X-ray signals (depicted as vertical lines) have been resolved, as have the energies of the component signal (depicted as crosses). The temporal position and the energy of the component signal were used as described above, in conjunction with the signal form, to determine a model of the Xenon gas proportional detector output: the resulting model is plotted in FIG. 16c.

The digitized output of the Xenon gas proportional detector was compared with the model of the Xenon gas proportional detector output to derive an estimate of the error made in characterizing the Xenon gas proportional detector output. This error signal is plotted in FIG. 16d. This error signal can then be used to determine thresholds for the exclusion of signal parameter estimates, such as the decision to accept or reject an estimate of signal energy may be determined by the magnitude or the error near the position of a signal peak.

Plural Signal Forms

For some detector types, such as large volume solid state detectors, the form of a given signal may be one of a plurality of possible signal forms. This may be intrinsic to the detector type, or be due to temperature or other measurement-specific factors.

For example, a CsI(Tl) detector is a scintillation detector that, depending on whether a neutron or gamma-ray is being detected, exhibits two distinct signal forms. Solid state radiation detectors can exhibit a time-varying signal form, even when detecting only one form of radiation; large volume High Purity Germanium (HPGe) detectors, for example, can produce an output signal whose form depends on the specific site of interaction between the radiation and the detector. The interaction of radiation with the Germanium crystal of a HPGe detector produces a multitude of electron-hole pairs; radiation induced charge is carried by both the electrons and the holes. However, the electrons and holes travel through the HPGe detector at different velocities, so the charge pulse produced by the electrons generally has a different form from that produced by the holes. Thus, the pulse produced by the detector (being the sum of the charges carried by both the electrons and holes) has a form dependent on the location of interaction.

Hence, the plurality of signal forms are the result of these varied physical mechanisms. The respective signal forms may be denoted $d_1[n], d_2[n], \ldots, d_Q[n]$, where Q is the total number of different signal forms that may be generated by a particular detector type. Each of the possible signal forms is characterized in the same way that the signal form of data having a single signal form is characterized. With plural signal forms, however, the calibration process must be extended for an appropriate length of time to ensure that all of the possible signal forms have been identified and characterized; the estimation of signal parameters, including temporal position and signal energy, can be performed once the form of each signal in the data stream has been identified. In order to estimate these signal parameters correctly, a number of possible extensions of the method described above (for data with a single signal form) may be employed.

1. The signal parameters, including signal temporal position and signal energy, may be estimated for each signal in the data stream by treating all signals in the data stream as having the same form, such as of the first signal, viz. $d_p[n]$. The parameters for those signals that do not acceptably conform to signal form $d_p[n]$ are rejected at the validation phase; signals for which the parameters have been estimated successfully and thus acceptably conform to signal form $d_p[n]$ are subtracted from the data stream. This process is repeated successively for $d_2[n]$ up to $d_Q[n]$, where at each stage signal parameters are estimated for signals that are of the signal form used at that stage. At each stage matrix Equation 4 is solved with matrix A constructed repeatedly using, in iteration p, the signal form $d_p[n]$. At the conclusion of the process, those signals that have not passed the validation phase for any of the plurality of signal forms are rejected as not acceptably conforming to any of the plurality of signal forms.

2. In a variation of the first approach, the signal parameters are estimated for each of the signal forms in turn, but the signal estimates are not subtracted at each stage. Instead, the estimated signals are used in a final signal validation stage to determine the signal form and signal parameters that provide the best overall estimate of the data stream. This allows for the possibility that a signal is incorrectly estimated to be of one form, when it is actually of a form that has not yet been used to estimate the signal parameters.

3. In a further variation of the first approach, it may be possible to model each of the signal forms $d_p[n]$ as a linear combination of two signal forms, termed $d_1[n]$ and $d_2[n]$ for convenience. Hence, the pth signal form $d_p[n]$ is modeled as:

$$d_p[n]=(a \cdot d_1[n]+b \cdot d_2[n]) \quad (8)$$

where a and b are unknown constants that can be determined directly from this equation if necessary. In order to solve the matrix equation in this case, the matrix equation is extended to be:

$$x = [A_1 \vdots A_2] \begin{bmatrix} \gamma \\ \cdots \\ \beta \end{bmatrix} + \omega, \quad (9)$$

where the sub-matrices $A_1$ and $A_2$ are formed from the signal forms $d_1[n]$ and $d_2[n]$ respectively using Equation 5. The vector of unknown signal energies a has been redefined as being made up of vectors $\gamma$ and $\beta$, so that the energy of the actual signal form of signal i can be estimated as $\alpha_i = \gamma_i + \beta_i$. The new system of linear equations is solved using the same methods as those used to solve the earlier matrix equation, Equation 4. It should be noted that this approach eliminates the need for explicitly estimating the unknown constants a and b, and also allows for the possibility that the signal form may be from a continuum of possible signal forms that can be represented as a linear combination of the two signal forms $d_1[n]$ and $d_2[n]$.

Thus, this approach permits a practically unlimited number of signal forms to be represented.

4. In a further variation of approach 3, the procedure of decomposition of each of the plurality of signal forms into a linear combination of just two signal forms may be extended to the general case where the plurality of signal forms may be decomposed as a linear combination of an arbitrary number of signal forms. The matrix A and the signal energy vector a is augmented accordingly.

Example

An exemplary oil well logging apparatus according to the embodiment of FIG. 1 was tested by lowering its tool 12 into a container of test material. The test material was illuminated with neutron source 14, observations were made with detector 16, whose output was pre-processed by pulse shaping module 24 and recorded on data capture and analysis module 26. The pre-processed detector output was captured at a sample rate of 52.5 MHz.

The procedure was repeated at different source intensities, so as to achieve different detection count rates. In this way the throughput performance and energy resolution variation with count rate of apparatus 10 could be assessed.

The objective of the analysis was to obtain radiation energy spectra for each of the source and processing electronics configurations, and to obtain spectra obtained during the periods when source 14 was on, when source 14 was off, and when the source was off for long intervals.

The analysis was performed off-line: the recorded data was subsequently 'played' into the data analysis component of data capture and analysis module 26, the output of which was used to produce energy spectra for display. The analysis process is illustrated in FIG. 8, which also shows the intermediate steps of the analysis. Output 130, in this example, comprised a histogram plot of the processed data on the display of data capture and analysis module 26.

Figure 17:
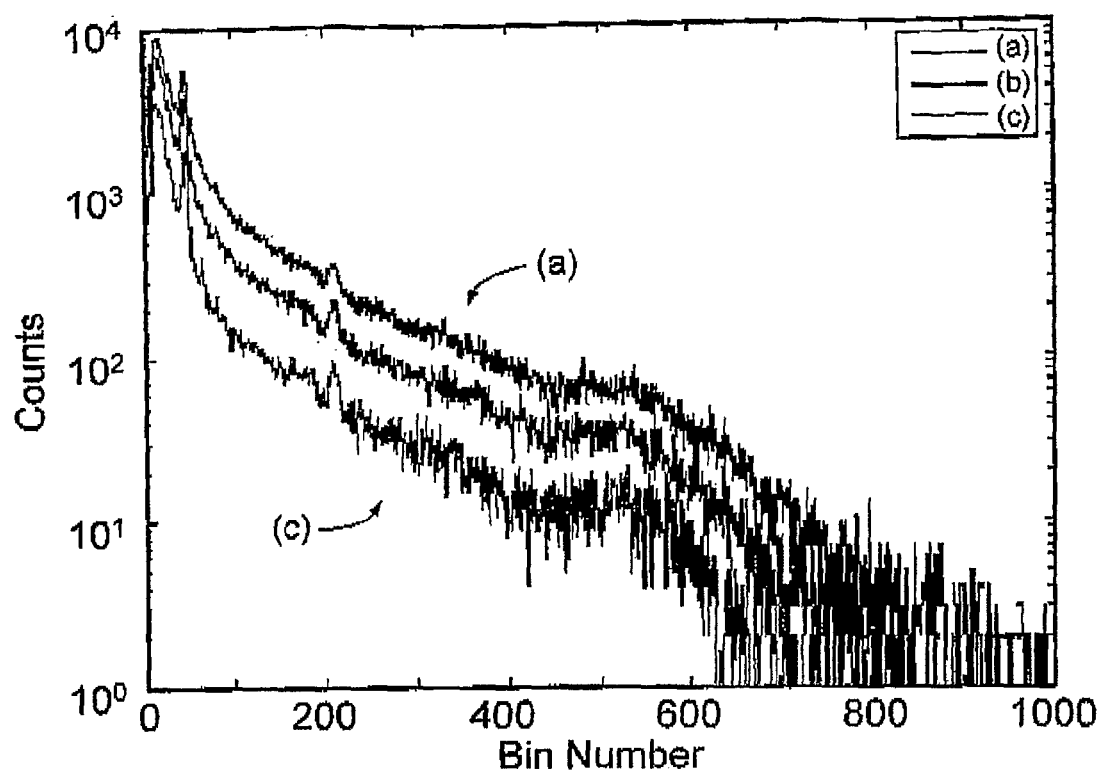
FIG. 17 is a plot of the energy spectrum collected with the apparatus of FIG. 1, with the neutron source on, plotted on log-linear scale.
Figure 18:
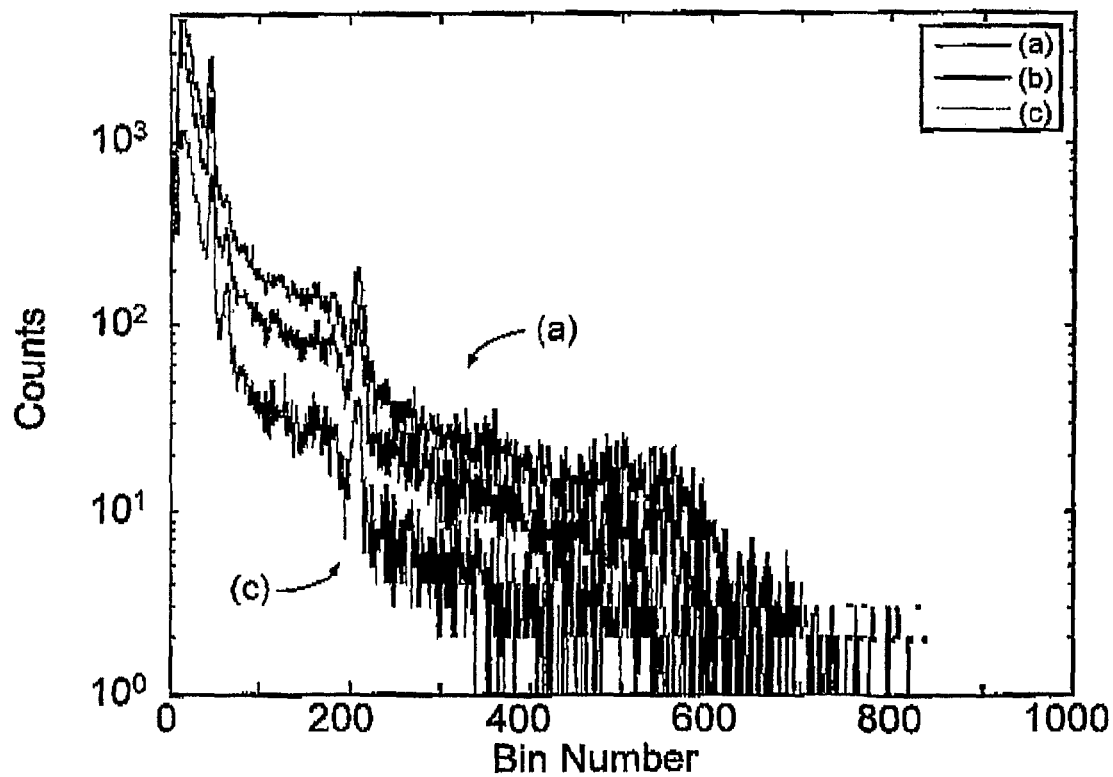
FIG. 18 is a plot of the energy spectrum collected with the apparatus of FIG. 1, with the neutron source off, plotted on log-linear scale.

FIG. 17 is a plot of energy spectra collected with source 14 on, plotted on log-linear scale, while FIG. 18 is a plot of energy spectra collected with source 14 off, also plotted on log-linear scale. In both cases, the three spectra (a), (b) and (c) correspond to different currents supplied to neutron source 14, and hence different count rates. These count rates were approximately 600-700 kHz, 300 kHz and 150 kHz. The higher the current of neutron source 14, the more neutrons are generated in any given neutron pulse and therefore the more gamma-rays produced in the test material and detected. The data was collected over the same period in each case, so the higher spectra relate to higher count rates.

For each experiment, 500 data files were recorded, with each file containing 262,144 data samples, or approximately 5 ms of data at the 52.5 MHz sampling rate. Hence a total of 2.5 seconds of data was recorded for each experiment.

Figure 19:
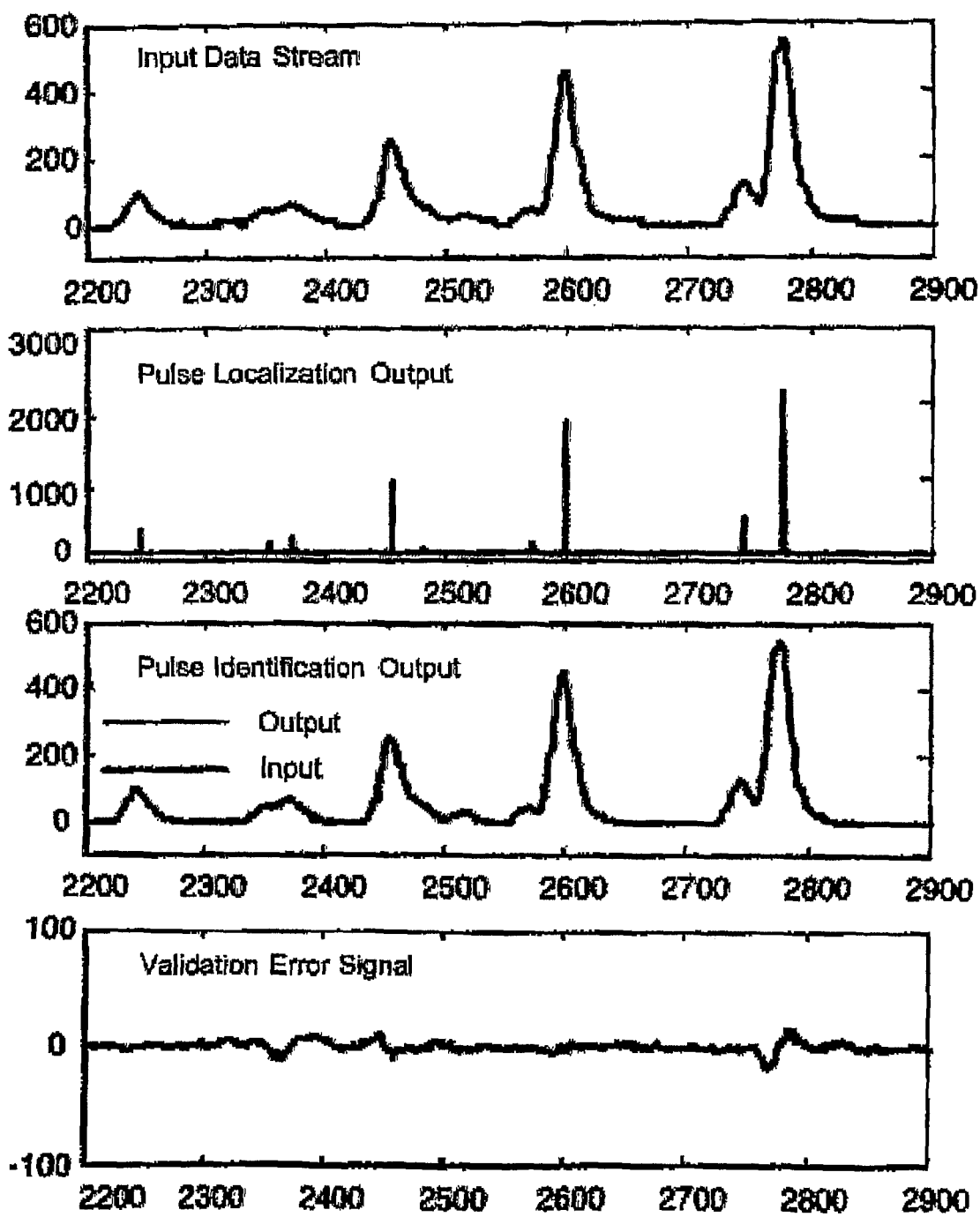
FIG. 19 comprises plots illustrating the different stages of data processing, showing a section of (i) the input data stream, (ii) the pulse localization output, (iii) the pulse identification output, and (iv) validation error signal.

The different stages of the data processing are illustrated by showing the results of the analysis of a small section of the recorded data in FIG. 19. FIG. 19 comprises four plots; from top to bottom these are (i) the input data stream, (ii) the pulse localization output, (iii) the pulse identification output, and (iv) validation error signal. In this analysis sample, the pulse identification output is almost perfectly overlaid on the input data stream, demonstrating the ability of apparatus 10 to resolve pulses in the presence of pulse pile-up, and accurately determine the energy of each pulse in the data stream. If the estimated pulse parameters are incorrect, a high validation error signal will result, and enable data in that region to be rejected.

The following observations can be made in the light of these results.

As the source intensity is increased, so too does the count rate of the processed output. Existing approaches reject data affected by pulse pile-up, which increases sharply with count rate, so the ratio of processed output to input stream diminishes. The ratio of processed count rate in the present measurements, however, is well maintained throughout as a percentage of input count rate.

As the count rate increases, the energy resolution of the main spectral feature (at approximately bin 200) remains almost constant. This demonstrates the ability of apparatus 10 to continue to perform well and maintain energy resolution at extremely high count rates.

In the source off spectra of FIG. 18, features are visible that are not evident in the source on spectra of FIG. 17. It is anticipated that with the additional use of a source synchronization signal, to avoid misallocation of data, such features would be still more clearly observed.

Example

As will be appreciated by those in the art, in oil well logging a detailed understanding of the reservoir rock formation is required in order to improve the efficiency and cost effectiveness of oil extraction from the reservoir. Neutron activation techniques (inelastic, capture and activation) can be used in a down-hole environment for the evaluation of most of the minerals and fluids found in subsurface geological formations. These techniques can be used to distinguish between oil, gas and water and also be used to identify minerals based on their elemental composition. A detailed understanding of the reservoir rock formation is essential for improving the efficiency and cost effectiveness of oil extraction from the reservoir. Other nuclear techniques including: neutron backscatter; gamma-ray logs and natural gamma-ray logs may also be used to understand characteristics of the rock formation.

Figure 20:
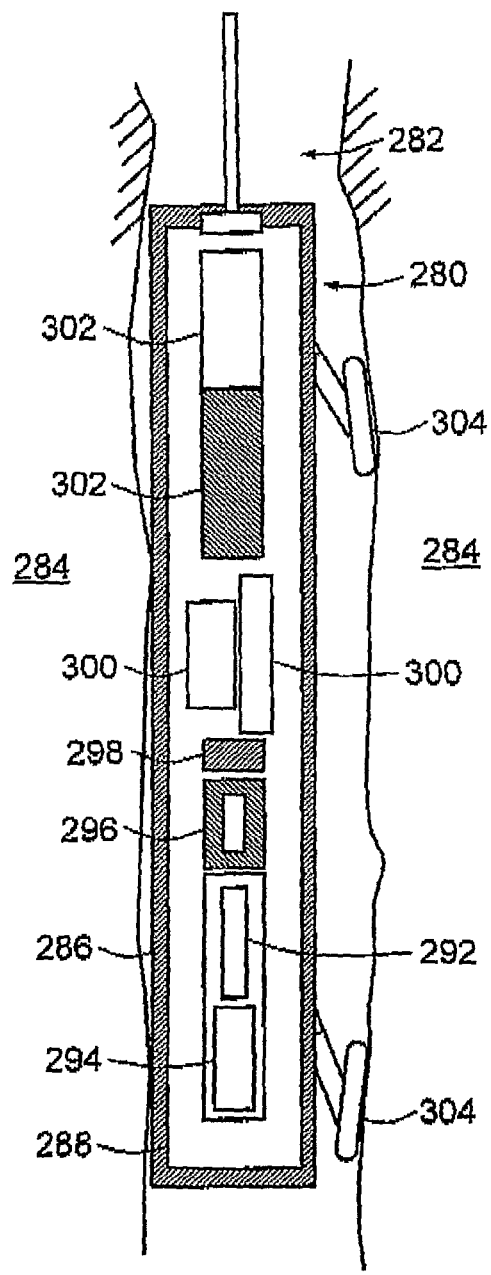
FIG. 20 is schematic, cross-section view of neutron activated gamma-ray spectroscopy well-logging tool of an embodiment of the present invention.

FIG. 20 is a schematic diagram of neutron activated gamma-ray spectroscopy well-logging tool 280 of the background art, located in a borehole 282 surrounded by rock formation 284. Tool 280 has a pressure resistant collar 286 to enclose and protect its other components from the environment encountered in use. Within collar 286, tool 280 has a chassis 288 to encase those components. Tool 280 has an overall length of approximately 3 m and a diameter of from 8 to 16 cm (according to application).

The components of tool 280 include a radiation source towards the distal end of tool 280 in the form of an electronic neutron generator (ENG) 292 (though other tools employ an isotopic source, such as AmBe). An ENG can produce a high radiation flux in situ without the radiation handling risk on the surface, as it can be turned on while the borehole but shut off when on the surface. ENG 292 generates neutrons by electrically accelerating deuterium ions into a tritium or deuterium target; the neutron output may be pulsed at tens of kHz. Tool 280 also has electronics 294, adapted both to control the pulsing of ENG 292 and the gating of the detected radiation and located adjacent—and distal to—ENG 292.

Tool 280 includes, proximal to ENG 292, a neuron detector 296 for tracking the actual output flux of neutrons from ENG 292, as the absolute strength of the nuclear source is often important in the calibration of detection. Proximal to neutron detector 296, tool 280 has lead or tungsten shielding 298, followed by near detectors 300 and then—towards the proximal end of tool 280—far detectors 302. Shielding 298 reduces the flux of radiation due to ENG 292 through near detectors 300, as that flux constitutes a background in any actual measurements.

Tool 280 also includes stabilisers 304, which are used to urge tool 280 against one side of borehole 282 in use.

In use, tool 280 is lowered down borehole 282. ENG 292 is activated, and emits neutrons isotropically into the surrounding reservoir rock formation 284 where they interact with the constituent elements of the formation. A portion of the resultant radiation flux in turn interacts with near detectors 300 and far detectors 302. Depending on the nuclear interaction being used the resultant radiation includes gamma-rays or neutrons. The signals outputted by near detectors 300 and far detectors 302 are subjected to spectroscopic analysis; in addition, the time distribution of detected neutrons and/or gamma rays can be used to further probe the constituent elements of rock formation 284.

ENG 292 can produce neutron yields in the order of 2-3× 108 neutrons per second, substantially higher than isotopic sources. (Isotopic sources are limited by the requirement for safe handling, such as to 4×107 neutrons per second for 16 Curies of AmBe.) The flux of the neutrons from source (whether ENG or isotopic source) affects the count-rate observed in near detectors 300 and far detectors 302, but with an ENG the instantaneous count-rate can range up to several hundred thousand counts per second. At the elevated count-rates produced by ENGs the effects of detector and electronic timing resolution are very significant and dead-time corrections and pulse pile-up rejection techniques are employed to facilitate accurate elemental composition estimation.

Figure 21:
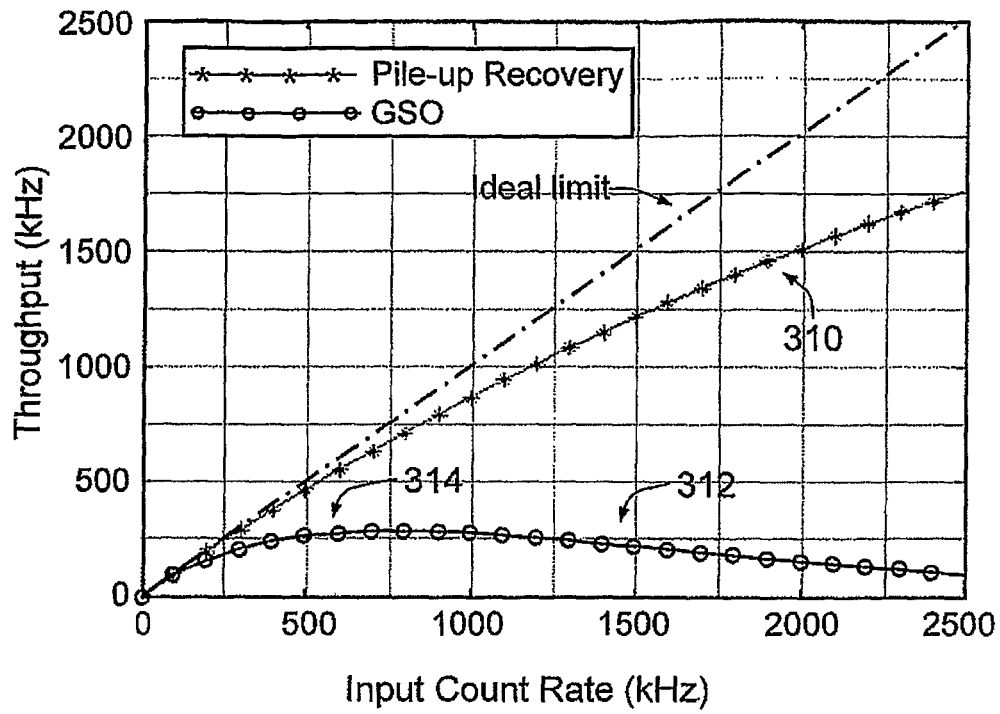
FIG. 21 is a plot of throughput count rate as a function of input count rate, calculated for the well-logging tool of FIG. 20, and of the calculated performance of the signal processing method for pulse pile-up recovery of an embodiment of the present invention.

FIG. 21 is a plot of calculated throughput count rate (kHz), that is, the number of events correctly registered by one of the detectors of tool 280 and electronics 294, versus input count rate (kHz). The dashed line 310 indicates a perfect detection system where throughput count rate equals input count rate. The performance of the signal processing method for pulse pile-up recovery of the embodiment of FIG. 9 has been calculated and is plotted as stars in this figure at 310. The calculated throughput count rate of the GSO scintillation detector with standard detector electronics is plotted as circles at 312. It can been seen that the performance of the GSO with standard detector electronics reaches a point 314 at which further increases in input count rate (such as from an increase in the strength of the radiation source) do not produce an increase in throughput count rate. This is because the probability of pile-up increases as the input count rate increases, and data corrupted by pulse pile-up cannot be used.

Figure 22A:
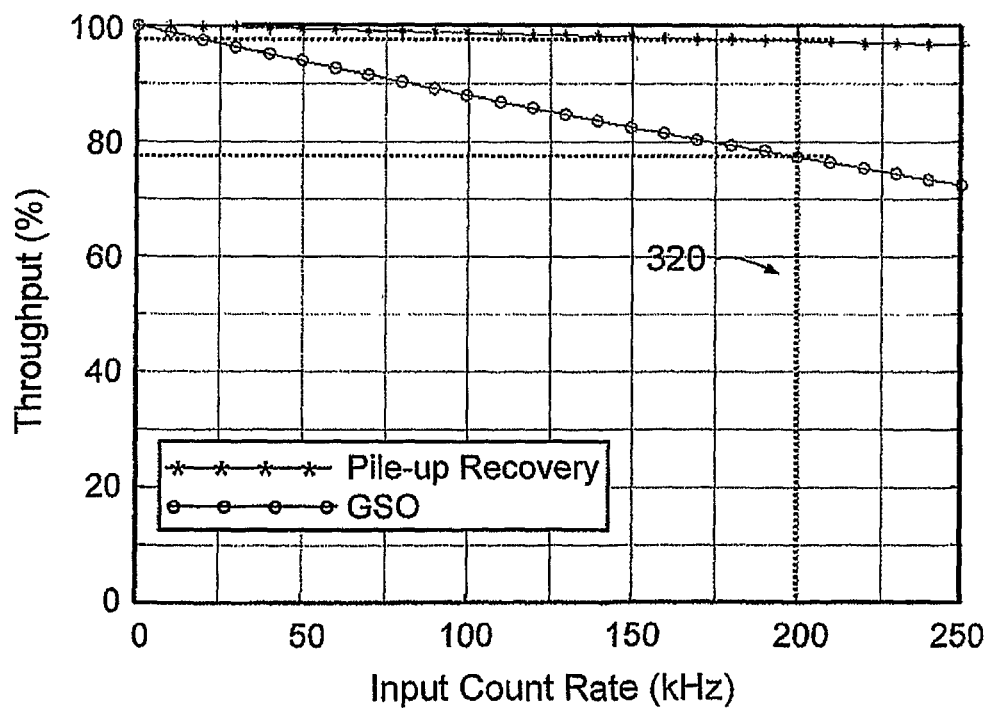
FIGS. 22a and 22b are plots of percentage throughput as a function of input count rate calculated for the well-logging tool of FIG. 20, and of the calculated performance of the signal processing method for pulse pile-up recovery of an embodiment of the present invention.
Figure 22B:
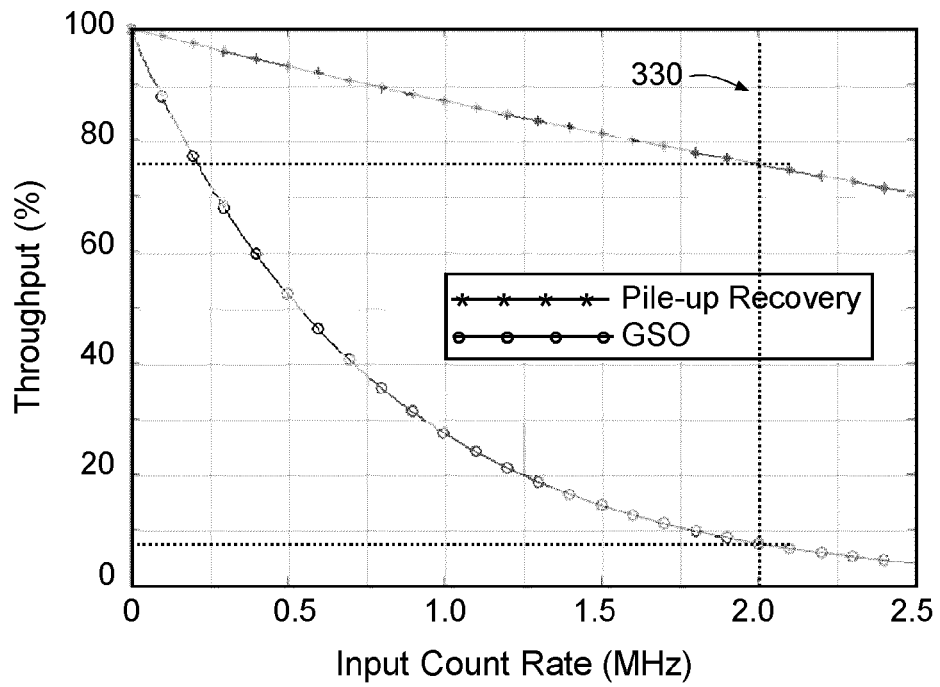

FIGS. 22a and 22b are plots of calculated percentage throughput versus input count rate, depict the percentage of input radiation events which will be detected without pulse pile-up. It is apparent from these plots that, at an input count rate of 200 kHz (320), the throughput of the GSO detector with standard electronics is approximately 78%, whereas the GSO detector with the signal processing method of the present embodiment at this count rate has a throughput of approximately 98%. Hence, the time required to conduct an oil well log at any particular depth—the dwell time—using the method of the present invention would be 78/98=80% the time required using the standard detector electronics.

However, as depicted in FIG. 22b, the method of the present invention is able to operate at input count rates significantly above 200 kHz while maintaining good throughput statistics: at an input count rate of 2 MHz (330) the throughput remains greater than 75%. If a source strength were employed such that the input count rate were 2 MHz it would be possible to reduce, by a factor of 9.6, the require time to conduct an oil well lag at any particular depth.

Nuclear logging tools of the type shown in FIG. 20 may be able to conduct a standard oil well log at the rate of approximately 3600 feet per hour (~1100 m/h) and achieve an elemental accuracy of around ±5%. Alternately they may be able to conduct a 'high resolution' oil well log at the rate of approximately 1800 feet per hour (~550 m/h) and achieve an elemental accuracy of approximately ±2%. Using the method of this embodiment, a standard oil well log, using a source that produced an input count rate of 200 kHz, could be run 20% faster at a rate of ~1,320 m/h (neglecting the time required to relocate tool 280 between measurements). Alternatively, if a high flux source is used, a logging rate faster than 1100 m/h may be obtained with an elemental accuracy greater than ±5%. It is thus reasonably expected that the ability to process significantly high throughput count rates should also enable the size of the nuclear well logging tool to be reduced below 3 m in length, by 10 or 20%.

The amount of shielding 298 between ENG 292 and detectors 300, 302 may thus be reduced (or eliminated), or detectors 300, 302 may be made smaller (and hence lighter), or both, enabling a slimmer tool designed to fit into narrower boreholes. The selection of modification—and the resulting benefit—can be made according to application.

Figure 23:
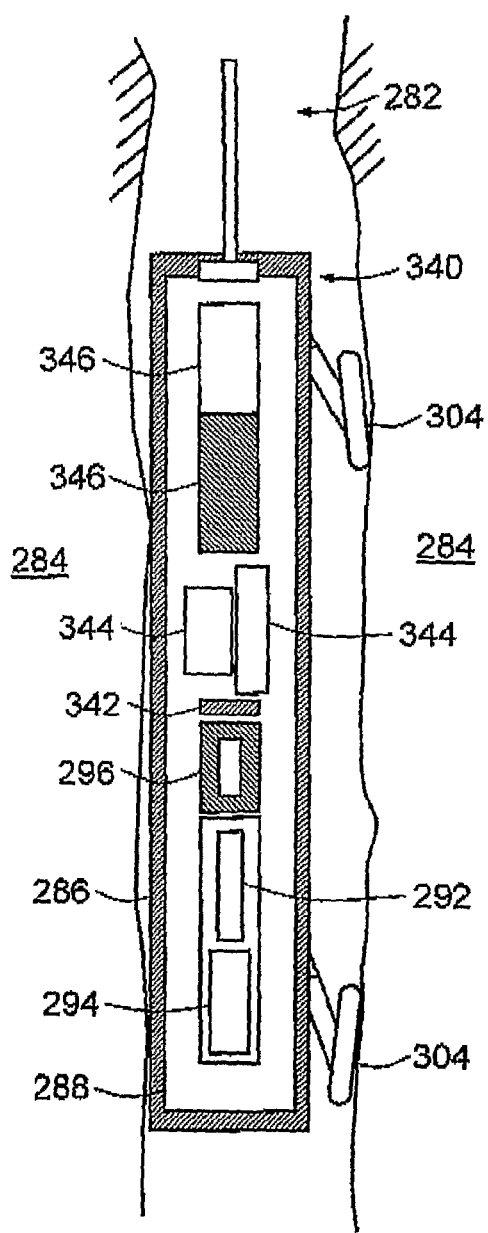
FIG. 23 is schematic, cross-section view of neutron activated gamma-ray spectroscopy well-logging tool according to an embodiment of the present invention.

FIG. 23 is thus a schematic diagram of neutron activated gamma-ray spectroscopy well-logging tool 340 according to an embodiment of the present invention, located in a borehole 282 surrounded by rock formation 284. Tool 340 is essentially identical with tool 280 of FIG. 280, and like reference numerals are used to indicate like features. However, tool 340 has lead or tungsten shielding 342 that is thinner than shielding 298 of tool 280, and near and far detectors 344, 346 that are shorter than corresponding detectors 300, 302 of tool 280. Consequently, the overall length of tool 340 is significantly less than that of tool 280.

Alternative Embodiments

Figure 24:
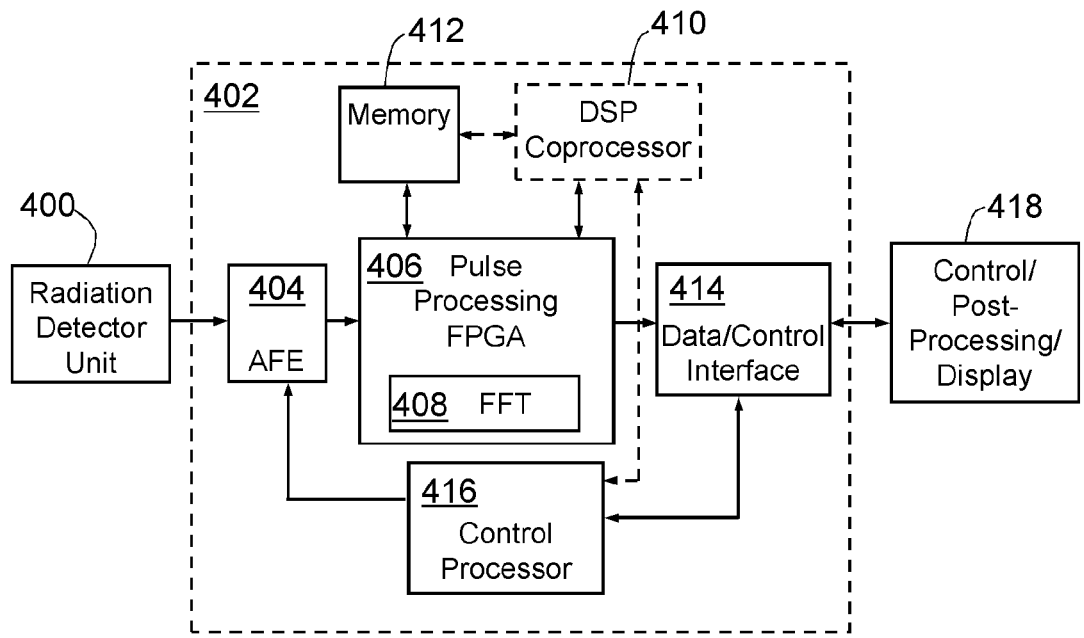
FIG. 24 is an alternative schematic diagram of the apparatus of FIG. 1.

FIG. 24 is a schematic diagram of the functional elements of data capture module 26 of FIG. 1, with detector 16, and is provided to explain in more detail the signal processing method for employed by the apparatus of FIG. 1 in relation to the fourth and fifth aspects of the invention. Referring to FIG. 24, radiation detector unit (400) is connected to a pulse processing board (402) via an analog front end (AFE 404). The purpose of the AFE (404) is to digitize the signal produced by the radiation detector unit (400) by performing analog to digital conversion at, in this embodiment, 125 MHz with 12-bit conversion accuracy.

After the output of the radiation detector unit (400) has been digitized by the AFE (404), the signal processing method for pulse pile-up recovery is implemented. Referring again to FIG. 24, the digital signal produced by the AFE (404) is passed into the pulse processing Field Programmable Gate Array (FPGA) (406). The pulse processing FPGA (406), which includes a Fast Fourier Transform module (408), implements the pulse processing method of this embodiment; a digital signal processing coprocessor (410) may optionally be used to assist the pulse processing FPGA (406) to implement the pulse processing method. Variables required by the pulse processing FPGA (406) and data produced at interim steps of the pulse processing method are optionally stored in memory (412). The signal processing is controlled via a Data/Control Interface (414) which, in conjunction with a Control Processor (416), can be used to modify the implementation of the signal processing. The output data from the signal processing method can be displayed on a display (418) via the Data/Control Interface (414). Display (418) is provided in a computer that may, if desired, be used to perform post-processing and system control.

Figure 25:
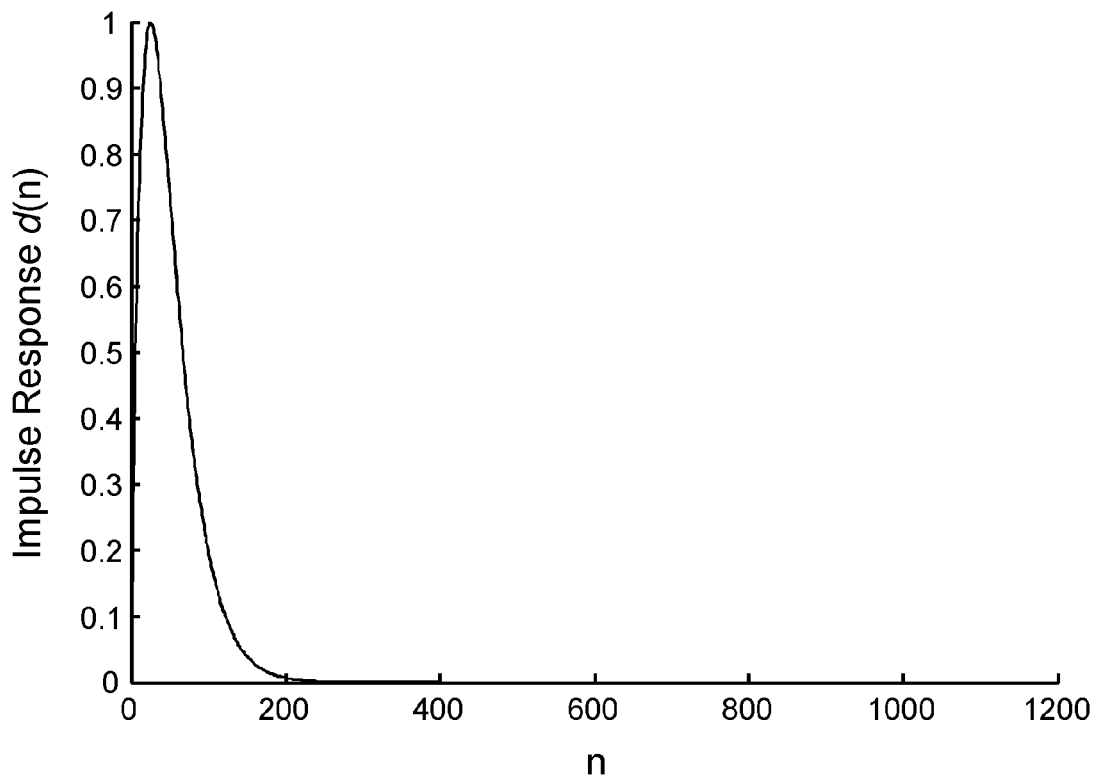
FIG. 25 is a schematic plot illustrating a typical output of the detector unit of FIG. 1 in response to a single detection event.

The pulse processing method of this embodiment is performed in the Fourier domain. The typical output response d[n] of detector unit (400) to a single detection event is illustrated in FIG. 25, while FIG. 26 is a schematic plot illustrating a typical output x[n] of detector unit (400) when multiple pulses have piled up.

Figure 26:
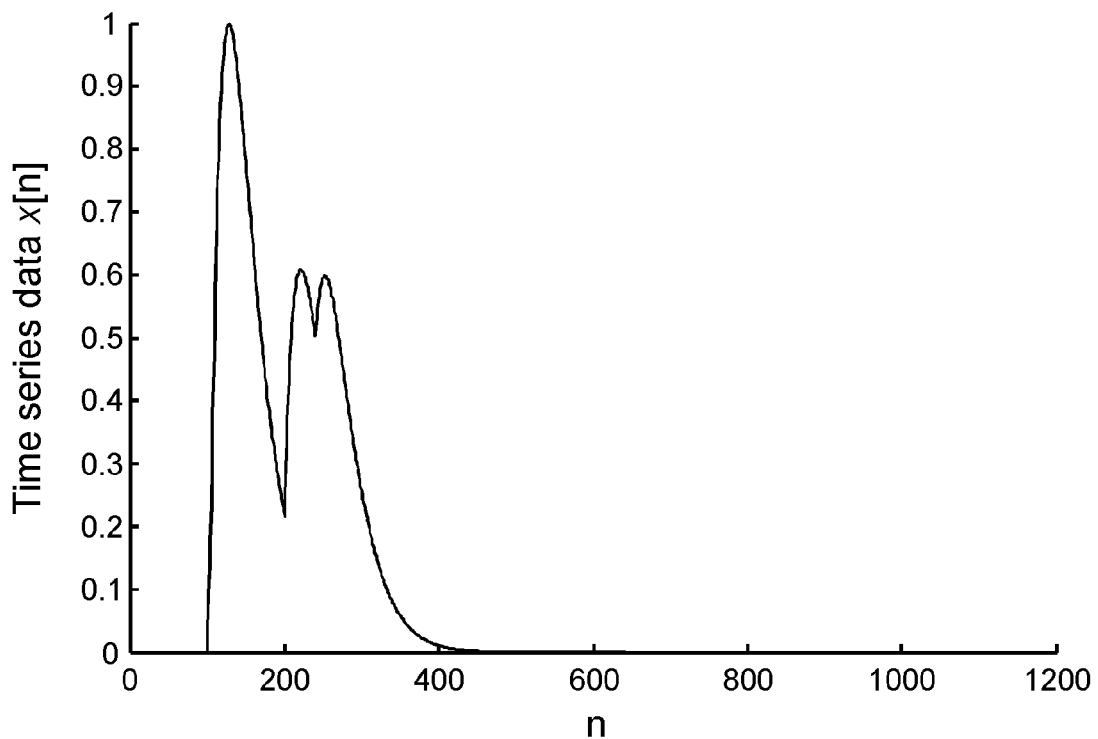
FIG. 26 is a schematic plot illustrating a typical output of the detector unit of FIG. 1 modelled as a time series of pulses.

The time series of FIG. 26 consists of four pulses occurring at times 100, 105, 200 and 240. The first three pulses each have the same amplitude; the fourth has half the amplitude of the first three. This information is not immediately apparent from an inspection of FIG. 26.

While both time of arrival and amplitude are often of interest, there exist numerous applications where only one parameter is of interest. The following two examples are given for the purposes of illustration.

(i) Amplitude of primary interest: The amplitude of pulses generated by detector unit (400) correspond to the energy of incident gamma rays, which in turn correspond to the atomic nuclei present in the region of the detector. In a material analysis application, the primary parameter of interest is the amplitude of the detector pulses, as this reveals the elemental composition of the material.

(ii) Time of arrival of primary interest: The differences in the time-of-arrival two separate detectors of two gamma rays generated by or arising from the same nuclear event can be used to infer the spatial location of the nuclear decay event. In a medical imaging application, estimating the time of arrival is likely to be of primary interest. (The energy of the events is generally known from the selection of the radio-isotope.)

While having knowledge of one parameter can assist in estimation of the other, it is not essential to have that knowledge though the resulting estimate may be considerably less accurate. For example, it is reasonably straightforward to estimate the time of arrival of pulses, without having any estimation of their amplitude. Likewise, there exist several methods for estimating the amplitude of pulses without having to estimate their time of arrival.

The effects of the time domain convolution can be removed by 'division' in the Fourier domain. This is performed by Pulse Processing FPGA 406 as follows.

Figure 27:
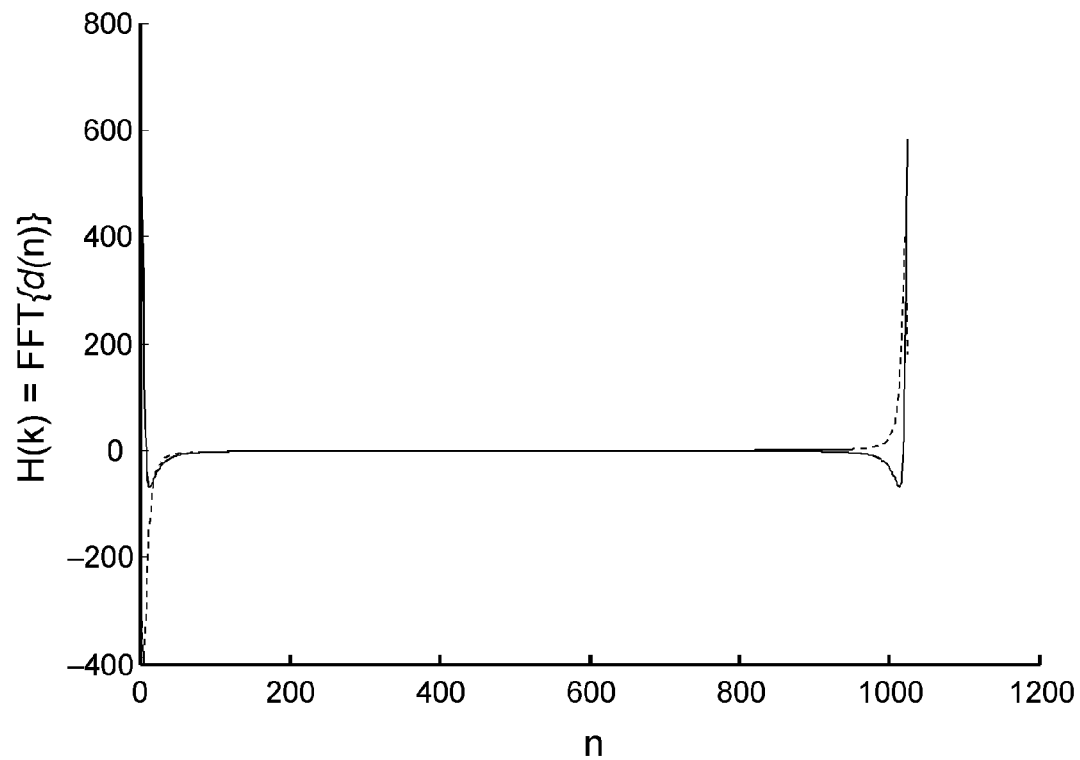
FIG. 27 is a schematic plot of the Fast Fourier Transform H(k) of the impulse response d[n] of FIG. 25, the real component shown with a solid curve, the imaginary component with a dashed curve.

FPGA (406) takes the Fast Fourier Transform H(k) of impulse response d[n]. FIG. 27 is a schematic plot of H(k) of impulse response d[n] of FIG. 25, the real component shown with a solid curve, the imaginary component with a dashed curve.

Figure 28:
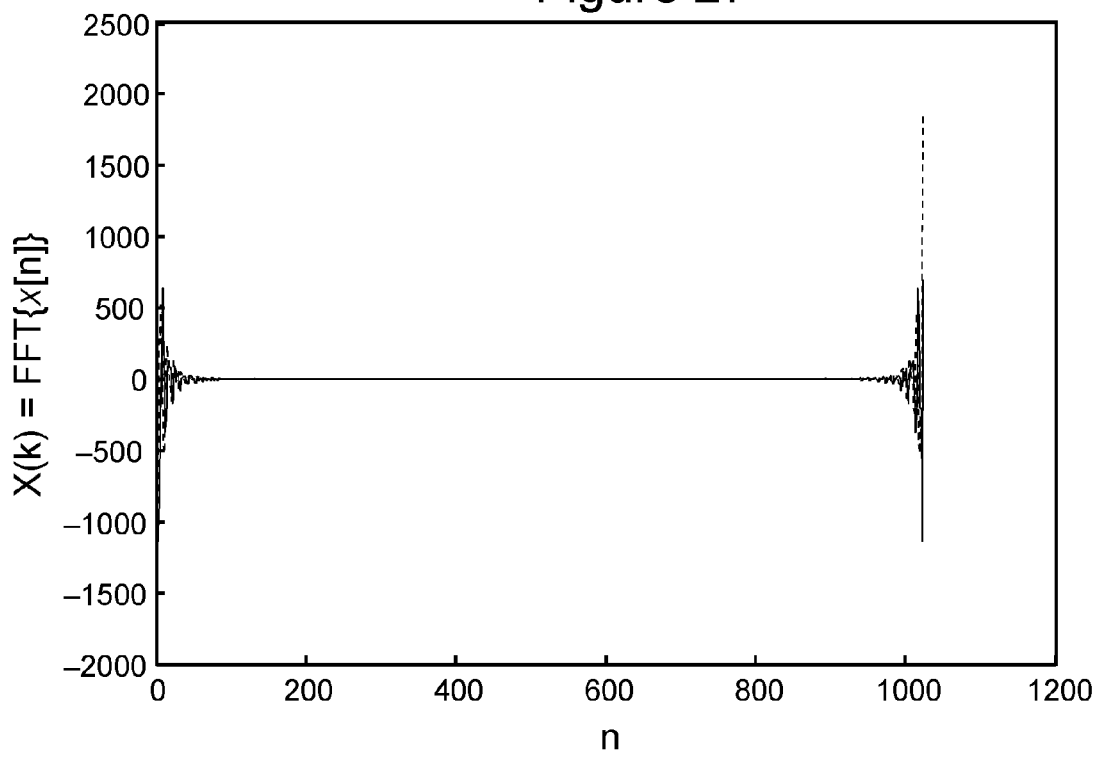
FIG. 28 is a schematic plot of the Fast Fourier Transform X(k) of the time series x[n] of FIG. 26, the real component shown with a solid curve, the imaginary component with a dashed curve.

FPGA (406) then takes the FFT of the time series data x[n] (cf. FIG. 26) and thereby forms X(k)=FFT{x[n[}. FIG. 28 is a schematic plot of X(k) of the time series x[n] of FIG. 26, the real component shown with a solid curve, the imaginary component with a dashed curve.

FPGA (406) then forms the function Y(k), which is a function of the transformed time series X(k) and the transformed signal form or impulse response H(k):

$$Y(k)=X(k)/H(k) \qquad (10)$$

FPGA (406) then evaluates Y(k), that is, divides each element of X(k) by each corresponding element of H(k).

Figure 29:
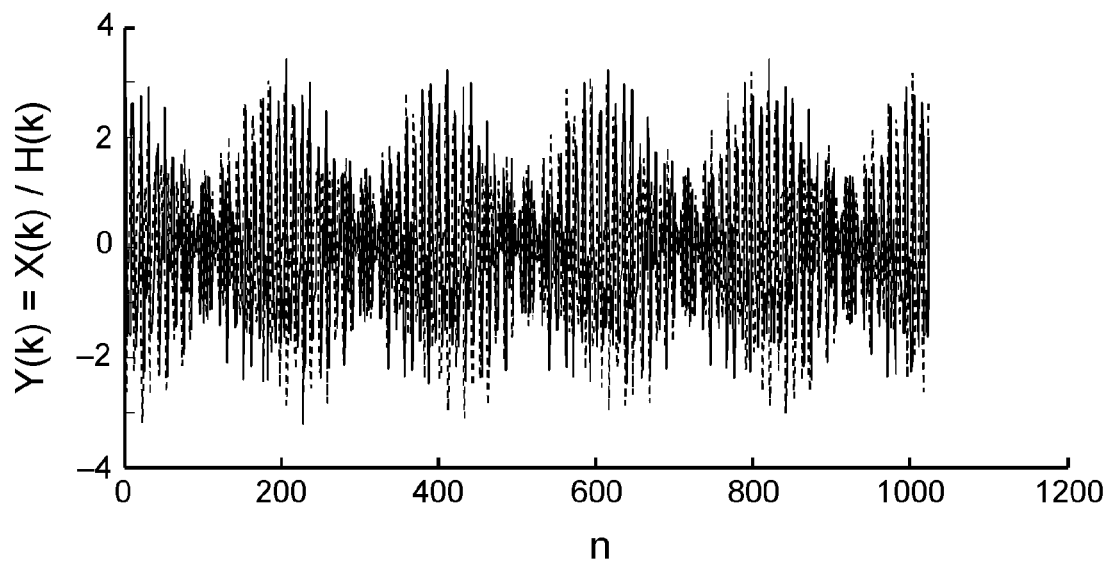
FIG. 29 is a schematic plot of the function Y(k)=X(k)/H(k) based on the data of FIGS. 27 and 28.

FIG. 29 is a schematic plot of Y(k) derived in this manner. Each pulse in the time domain is now modelled as a complex sinusoid in the Fourier domain. FIG. 29 comprises four complex sinusoids each with a respective frequency and amplitude. The amplitude of each sinusoid in the Fourier domain is related to the amplitude of each pulse in the time domain. The frequency of each sinusoid in the fourier domain is related to the time-of-arrival in the time domain.

FPGA (406) models the output of the function Y(k) as a plurality of sinusoids, either explicitly or implicitly, in order to be able to estimate parameters of those sinusoids. In this embodiment, therefore, FPGA (406) fits the plurality of sinusoids to the output and obtains estimates of the parameters of the sinusoids using known techniques, such as Maximum Likelihood, EM, Eigen-analysis, or other suitable algorithm.

The estimated amplitudes of the sinusoids can then be manipulated by FPGA (406) to obtain the energies of the pulses, hence without having estimated the time of arrival of any pulse. For greater accuracy FPGA (406) can employ both the amplitudes and frequencies of the sinusoids.

Figure 30:
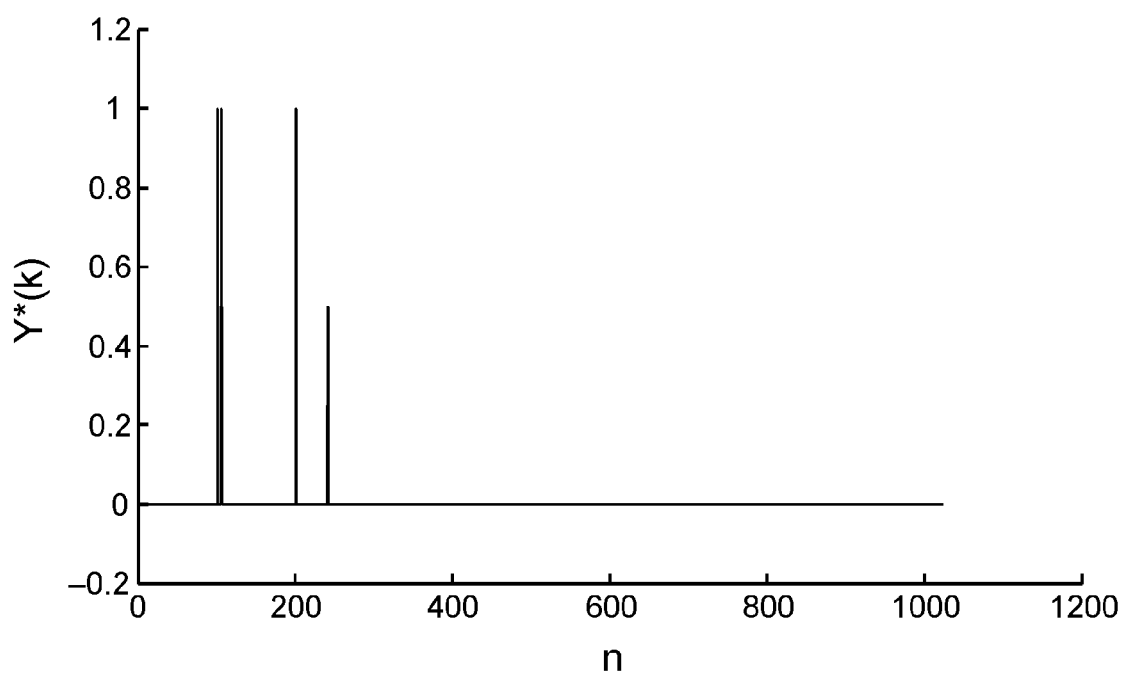
FIG. 30 is a schematic plot of the inverse FFT transform of Y(k) (of FIG. 29)

Optionally, estimates of the frequencies of the sinusoids can be transformed to obtain time of arrival information about the pulses. The inverse FFT of Y(k) is shown in FIG. 30. It will be noted that there are four 'delta' spikes at temporal position 100, 105, 200 and 240 corresponding to the time of arrival of each pulse.

Figure 31:
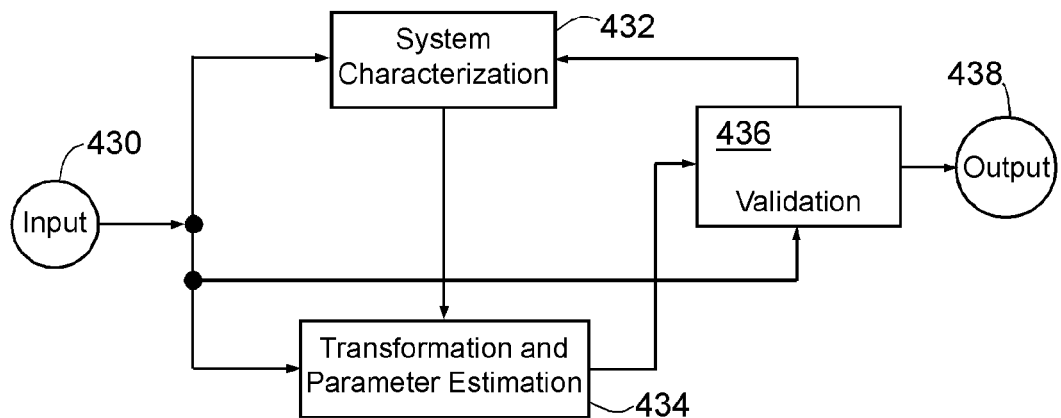
FIG. 31 is an alternative schematic representation of the signal processing method for pulse pile-up recovery employed by the apparatus of FIG. 1 for analyzing spectroscopic data according to this embodiment of the invention.

FIG. 31 is a schematic diagram of the signal processing method for pulse pile-up recovery of radiation signals in the detector time series of this embodiment. The digitized detector signal (from AFE (404)) forms the input (430) for this signal processing method. Offline System Characterization (432) is used to determine the detector impulse response d[n] unique to the particular digitized detector signal. Characterization data generated in System Characterization phase (432) is used in a Transformation and Parameter Estimation phase (434). The Transformation and Parameter Estimation phase (434) estimates, principally operating in the Fourier domain as discussed above, the number and energies (or equivalently pulse amplitudes) of radiation signals or pulses within the digitized detector signal from the digitized detector signal and the detector impulse response. Validation (436) involves comparing the output of the Transformation and Parameter Estimation phase (434) with the digitized detector signal (430). If this comparison indicates that any of the pulse parameters have been estimated inaccurately, those parameters are rejected so that only valid data is output (438). The error signal generated in the Validation phase (436) is also employed in System Characterization (432). In circumstances where the detector impulse response may change over time, such as owing to the aging of components, temperature variations or increased radiation fluxes, System Characterization (432) updates the detector impulse response online and adaptively by employing the error signal. Such updating of the detector impulse response may be performed with any suitable adaptive method, such as least mean squares adaptation, normalized least mean squares adaptation or recursive least squares adaptation as described, for example, by S. Haykin [*Adaptive Filter Theory*, 4th Ed, Prentice Hall, 2002].

Figure 32:
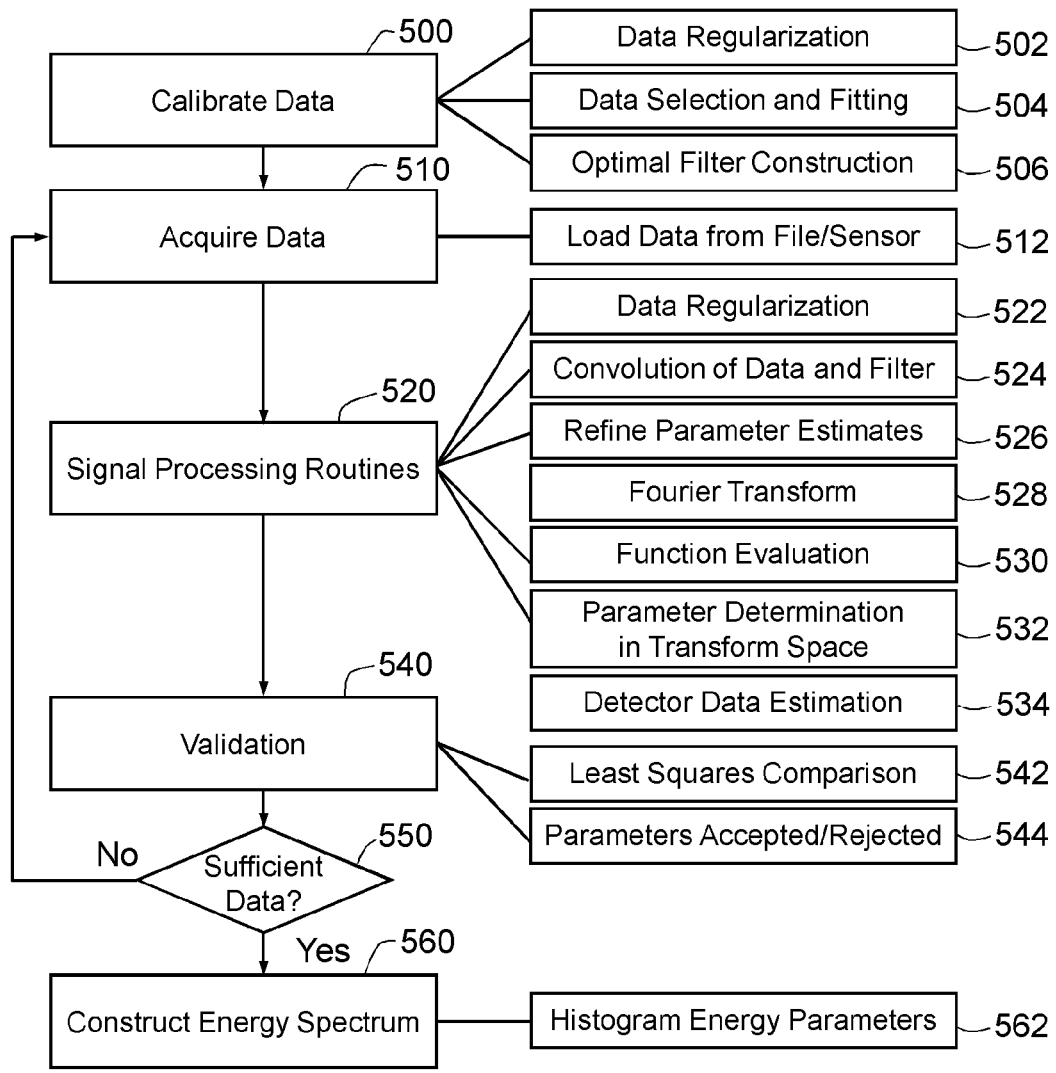
FIG. 32 is an alternative schematic flowchart of the signal processing method for pulse pile-up recovery employed by the apparatus of FIG. 1 for analyzing spectroscopic data according to this embodiment of the invention.

FIG. 32 is a flow diagram of the signal processing method of this embodiment. At step (500), calibration is performed. This involves Data Regularization or Conditioning (502), Data Selection and Fitting (504) and Optimal Filter Construction (506). In Data Regularization (502), calibration data (signals recorded at a low incident radiation flux) are loaded from data files, the integrity of these calibration data is checked and any bias in the baseline of the data removed. Data Selection and Fitting (504) involves selecting only that data corresponding to the detection of single radiation events and constructing a data-based model of the detector impulse response. A functional form of this model is then obtained by fitting a suitable function to the data, such as a polynomial, exponential or spline function. This results in the expected impulse response of the detector d[n]. Optimal Filter Construction (506) employs this detector impulse response to construct a suitable filter for the detector, such as an inverse filter or a matched filter.

At step (510) data is acquired, but may be affected by significant pulse pile-up. The data may be input (512) either from a file or directly from the detector elements (16).

At step (520) signal processing routines are applied to determine the amplitude and timing parameters of the signals in the time series. Firstly the data is conditioned (122) to remove any bias in the baseline of the data. Next, the detector data is convoluted (524) with the filter derived in step (506) to provide an initial estimate of the number of pulses (N). The estimate of the number of pulses (N) is then further refined (526) using a suitable peak detection process.

A Fourier transform is applied (528) to the digital time series and the signal form, a function of which is evaluated (530) and parameters in the transform space of that function—suitably modelled—are determined (532). Finally, from the parameters of the modelled function in transform space, an estimate is made of parameters of the original data and hence of the detector data stream ($\hat{x}[n]$) (534).

At step (540) the validation phase (436) referred to above is performed, which may be referred to as error checking as, in this embodiment, validation involves determining an error signal e[n], computed successively for the set of samples corresponding to each signal i where 1<i<N (N being the total number of signals in the data stream). This error signal is calculated by determining (542) the squares of the differences between the time series data x[n] and the model based data-stream ($\hat{x}[n]$ from step (532)); e[n] is thus the square of the difference between x[n] and $\hat{x}$[n], given by:

$$e[n]=(x[n]-\hat{x}[n])^2 \quad (11)$$

If e[n] exceeds a predetermined threshold, these parameters are rejected (544) as this condition indicates that the signal parameters do not produce a model of the respective signal that acceptably conforms to that signal (that is, is sufficiently accurate); the relevant signal is deemed to constitute corrupted data and excluded from further spectroscopic analysis. The threshold may be varied according to the data and how closely it is desired that the data be modelled; generally, therefore, in any particular specific application, the method of validation and definition of the threshold are chosen to reflect the requirements of that application.

One example of such a threshold is the signal energy a, multiplied by a suitable factor, such as 0.05. Validation will, in this example, deem that the model acceptably conforms to the data constituting signal i when:

$$e[n]>0.05\alpha_i \quad (12)$$

Validation may be performed by defining the error signal and threshold in any other suitable way. For example, the error signal may be set to the absolute value of the error. The threshold may be defined to be a multiple other than 0.05 of the signal amplitude. Another threshold comprises a number of noise standard deviations.

Decreasing the threshold (such as by decreasing the coefficient of $\alpha_i$ in Equation 7) enables improved energy resolution at lower throughput, while increasing the threshold enables improved throughput at reduced energy resolution.

At step (550) a decision is made as to whether there is sufficient data. If not, processing continues at step (510). Otherwise, the method proceeds to step (560). At step (560) a gamma-ray energy spectrum is created. The detector data stream determined at step (532), which was deemed to be of sufficient accuracy at step (544), is represented (562) in the form of a histogram. This is the gamma-ray energy spectrum on which spectroscopic analysis may be performed.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, i.e. to specify the presence of the stated features but not to preclude the presence or addition of further features in various embodiments of the invention.

Further, any reference herein to prior art is not intended to imply that such prior art forms or formed a part of the common general knowledge.

The invention claimed is:
1. A method of borehole logging, comprising:
receiving radiation at a radiation detector from a material;
collecting detector output data from the radiation detector based on the received radiation; and
resolving individual signals corresponding to individual radiation detection events in the detector output data by:
obtaining or expressing the detector output data as a digital series,
obtaining or determining a signal form of the individual signals, forming a transformed signal form by transforming the signal form into a transform space according to a mathematical transform, forming a transformed series by transforming the digital series into the transform space according to the mathematical transform, obtaining a function output in the transform space based at least in part on the transformed series and the transformed signal form, estimating the function output as a plurality of oscillating functions, each corresponding to one of the individual signals in the detector output data, determining at least one of an amplitude and a frequency of each of the functions, and determining an energy of each of the individual signals based on the at least one of the amplitude and the frequency of the corresponding function.

2. The method as claimed in claim 1, wherein the receiving of the radiation at the radiation detector is performed by an oil well logging apparatus.

3. The method as claimed in claim 1, further comprising pulse shaping the detector output data.

4. The method as claimed in claim 1, further comprising employing a source synchronization signal to avoid misallocation of data.

5. The method as claimed in claim 1, wherein the radiation detector has an incident flux of gamma-rays of 100 KHz or more.

6. The method as claimed in claim 1, wherein the radiation detector has an incident flux of gamma-rays of 500 kHz or more.

7. The method as claimed in claim 1, wherein the resolving individual signals has a data throughput of greater than 70% for input count rates between 500 and 2000 KHz.

8. The method as claimed in claim 1, wherein the resolving individual signals has a data throughput of greater than 90% for an input count rate of 200 kHz.

9. The method as claimed in claim 1, wherein the resolving individual signals has a data throughput of greater than 95% for input count rates between 100 and 200 kHz.

10. The method as claimed in claim 1, wherein the resolving individual signals has a data throughput of greater than 95% for an input count rate of 100 kHz.

11. The method as claimed in claim 1, wherein the resolving individual signals has an input count rate of greater than 750 kHz.

12. The method as claimed in claim 1, wherein the resolving individual signals has an input count rate of greater than 1 MHz.

13. The method as claimed in claim 1, wherein the radiation detector comprises a gadolinium orthosilicate (GSO) detector.

14. The method as claimed in claim 1, wherein the collecting and resolving are repeated at different source intensities.

15. A method of mineral logging, comprising:
receiving radiation at a radiation detector from a material;
collecting detector output data from the radiation detector based on the received radiation; and
resolving individual signals corresponding to individual radiation detection events in the detector output data by:
obtaining or expressing the detector output data as a digital series,
obtaining or determining a signal form of the individual signals,
forming a transformed signal form by transforming the signal form into a transform space according to a mathematical transform, forming a transformed series by transforming the digital series into the transform space according to the mathematical transform, obtaining a function output in the transform space based at least in part on the transformed series and the transformed signal form, estimating the function output as a plurality of oscillating functions, each corresponding to one of the individual signals in the detector output data, determining at least one of an amplitude and a frequency of each of the functions, and determining an energy of each of the individual signals based on the at least one of the amplitude and the frequency of the corresponding function.

16. The method as claimed in claim 15, further comprising pulse shaping the the detector output data.

17. The method as claimed in claim 15, further comprising employing a source synchronization signal to avoid misallocation of data.

18. The method as claimed in claim 15, wherein the radiation detector has an incident flux of gamma-rays of 100 KHz or more.

19. The method as claimed in claim 15, wherein the radiation detector has an incident flux of gamma-rays of 500 kHz or more.

20. The method as claimed in claim 15, wherein the resolving individual signals has a data throughput of greater than 70% for input count rates between 500 and 2000 KHz.

21. The method as claimed in claim 15, wherein the resolving individual signals has a data throughput of greater than 90% for an input count rate of 200 kHz.

22. The method as claimed in claim 15, wherein the resolving individual signals has a data throughput of greater than 95% for input count rates between 100 and 200 kHz.

23. The method as claimed in claim 15, wherein the resolving individual signals has a data throughput of greater than 95% for an input count rate of 100 kHz.

24. The method as claimed in claim 15, wherein the resolving individual signals has an input count rate of greater than 750 kHz.

25. The method as claimed in claim 15, wherein the resolving individual signals an input count rate of greater than 1 MHz.

26. The method as claimed in claim 15, wherein the radiation detector comprises a gadolinium orthosilicate (GSO) detector.

27. The method as claimed in claim 15, wherein the collecting and resolving are repeated at different source intensities.

28. A borehole logging apparatus, comprising:
a borehole logging tool configured to irradiate a material surrounding the logging tool, detect radiation emitted by the material, and output detector data based on the detected radiation; and
a processor configured to receive the data as a digital series, and programmed to:
obtain or determine a signal form of individual signals present in the data,
form a transformed signal form by transforming the signal form into a transform space according to a mathematical transform,
form a transformed series by transforming the digital series into the transform space according to the mathematical transform,
obtain a function output in the transform space based at least in part on the transformed series and the transformed signal form, estimate the function output as a plurality of oscillating functions, each corresponding to one of the individual signals in the detector output data, determine at least one of an amplitude and a frequency of each of the functions, and determine an energy of each of the individual signals based on the at least one of the amplitude and the frequency of the corresponding function.

29. The apparatus as claimed in claim 28, wherein the borehole logging tool comprises an oil well logging apparatus.

30. The apparatus as claimed in claim 28, wherein the processor is further programmed to pulse shape the output of the logging tool.

31. The apparatus as claimed in claim 28, wherein the logging tool is less than 3 meters in length.

32. The apparatus as claimed in claim 28, wherein the borehole logging tool is further configured to irradiate at different source intensities and wherein the processor is further programmed to determine the energy of each of the individual signals at each of the different source intensities.

33. A mineral logging apparatus, comprising:
a mineral logging tool configured to irradiate a material surrounding the logging tool, detect radiation emitted by the material, and output detector data based on the detected radiation; and
a processor configured to receive the data as a digital series, and programmed to:
obtain or determine a signal form of individual signals present in the data,
form a transformed signal form by transforming the signal form into a transform space according to a mathematical transform,
form a transformed series by transforming the digital series into the transform space according to the mathematical transform,
obtain a function output in the transform space based at least in part on the transformed series and the transformed signal form,
estimate the function output as a plurality of oscillating functions, each corresponding to one of the individual signals in the detector output data,
determine at least one of an amplitude and a frequency of each of the functions, and
determine an energy of each of the individual signals based on the at least one of the amplitude and the frequency of the corresponding function.

34. The apparatus as claimed in claim 33, wherein the processor is further programmed to pulse shape the output of the logging tool.

35. The apparatus as claimed in claim 33, wherein the logging tool is less than 3 meters in length.

36. The apparatus as claimed in claim 33, wherein the mineral logging tool is further configured to irradiate at different source intensities, and the processor is further programmed to determine the energy of each of the individual signals at each of the different source intensities.

* * * * *